(12) United States Patent
Kuno et al.

(10) Patent No.: US 7,321,721 B2
(45) Date of Patent: Jan. 22, 2008

(54) HARD DISK APPARATUS, MEDIUM, AND COLLECTION OF INFORMATION

(75) Inventors: Yoshiki Kuno, Moriguchi (JP);
Toshikazu Koudo, Nishinomiya (JP);
Yoshitaka Yaguchi, Takatsuki (JP);
Noriaki Kubo, Takatsuki (JP);
Kenichiro Yamauchi, Nagaokakyo
(JP); Ryuichiro Tanaka, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1008 days.

(21) Appl. No.: 10/240,181

(22) PCT Filed: Mar. 26, 2001

(86) PCT No.: PCT/JP01/02404

§ 371 (c)(1),
(2), (4) Date: Aug. 6, 2003

(87) PCT Pub. No.: WO01/78076

PCT Pub. Date: Oct. 18, 2001

(65) Prior Publication Data

US 2004/0022526 A1   Feb. 5, 2004

(30) Foreign Application Priority Data

Mar. 28, 2000  (JP) ............................ 2000-89690

(51) Int. Cl.
H04N 5/00 (2006.01)
H04N 7/00 (2006.01)
H04N 9/79 (2006.01)

(52) U.S. Cl. .................. 386/125; 386/45; 386/105

(58) Field of Classification Search ............... 386/125, 386/124, 45, 46, 106, 105, 82, 1
See application file for complete search history.

(56) References Cited

U.S. PATENT DOCUMENTS 5,377,051 A * 12/1994 Lane et al. ................. 386/81

(Continued)

FOREIGN PATENT DOCUMENTS

EP    0 691 648    1/1996

(Continued)

OTHER PUBLICATIONS

Supplementary Partial European Search Report for EP 01-91-5774, dated Feb. 28, 2006.

(Continued)

Primary Examiner—Robert Chevalier
(74) Attorney, Agent, or Firm—RatnerPrestia

(57) ABSTRACT

Alternation processes reduce the recording and reproducing speed of a hard disk apparatus.

A hard disk apparatus comprising: an HDD 10 for recording AV data onto a hard disk; and stream controlling means 8 which is connected to the HDD 10 and thereby processes the signal of AV data transmitted from an IEEE1394 I/F 7 or the signal of AV data transmitted to the IEEE1394 I/F 7; whereby the hard disk apparatus can record and/or reproduce the AV data, wherein when AV data transfer is not normally completed for a disk access unit which is a minimum continuous unit in the access to the hard disk, an alternation process on a disk access unit basis is carried out so that another disk access unit is used hereafter in place of that disk access unit.

2 Claims, 20 Drawing Sheets

U.S. PATENT DOCUMENTS

| | | |
|---|---|---|
| 5,719,985 A | 2/1998 | Ito et al. |
| 5,870,523 A | 2/1999 | Kikuchi et al. |

FOREIGN PATENT DOCUMENTS

| | | |
|---|---|---|
| EP | 0 801 387 A2 | 10/1997 |
| EP | 0 872 839 | 10/1998 |
| EP | 0 880 136 A2 | 11/1998 |
| JP | 60-128528 | 7/1985 |
| JP | 7-230669 | 8/1995 |
| JP | 08-263220 | 10/1996 |
| JP | 10-74380 | 3/1998 |
| JP | 10-275429 | 10/1998 |
| JP | 11-120698 | 4/1999 |
| JP | 11-164111 | 6/1999 |
| JP | 11-296999 | 10/1999 |

OTHER PUBLICATIONS

Japanese Patent Office Final Office Action for Application No. 2000-089690 mailed Sep. 2, 2003.

International Search Report corresponding to application No. PCT/JP01/02404 dated Jul. 3, 2001.

English translation of Form PCT/ISA/210.

\* cited by examiner

Fig. 11

| LBA | Physical address |
|---|---|
| 0 | Track 1, Sector 1 |
| 1 | Track 1, Sector 2 |
| 2 | Track 1, Sector 3 |
| ⋮ | ⋮ |

Fig. 12 (a)

| DAU number | DAU number after alternate process | Error counter |
|---|---|---|
| 1 | 1 | 0 |
| 2 | 2 | 0 |
| 3 | 3 | 0 |
| 4 | 4 | 5 |
| 5 | 5 | 0 |
| 6 | 6 | 0 |
| 7 | 7 | 0 |
| 8 | 8 | 0 |
| 9 | 9 | 0 |
| 10 | 10 | 0 |
| ... | ... | ... |

Fig. 12 (b)

| DAU number | Start LBA |
|---|---|
| 1 | 1 |
| 2 | 4097 |
| 3 | 8193 |
| 4 | 12289 |
| 5 | 16385 |
| 6 | 20481 |
| 7 | 24577 |
| 8 | 28673 |
| 9 | 32769 |
| 10 | 36865 |
| ... | ... |

HARD DISK APPARATUS, MEDIUM, AND COLLECTION OF INFORMATION

TECHNICAL FIELD

The present invention relates to a hard disk apparatus, an access method, a recording/reproducing method, a medium, and a program.

BACKGROUND ART

With recent progress and spread of personal computers, a large number of hard disk apparatuses have been used as external storage units because of the advantage of their large capacity and high speed. At the same time, recent increase in the size of computer software and in the amount of handled data has caused the necessity of much larger capacity in hard disk apparatuses serving as external storage units.

In addition to the case of computers, also in digital AV equipment for recording and reproducing video and audio data by means of digital technology, the use of hard disk apparatuses is gradually increasing because of the advantage of their large capacity and high speed. Also in this application, hard disk apparatuses of much larger AV data of huge size.

Described below is a prior art system for recording and reproducing AV data.

FIG. 13 shows the configuration of a hard disk apparatus composed of a prior art hard disk drive (HDD) 10 and a personal computer (PC) 60. Here, the PC 60 is a personal computer for processing AV data in real time.

A magnetic disk 23 is a magnetic recording medium for recording data.

A magnetic head 24 is means of recording and reproducing information to and from the magnetic disk 23.

An actuator 25 is means of positioning the magnetic head 24 at an arbitrary radial position on the magnetic disk 23 with the magnetic head 24 at the tip.

The actuator 25 comprises a carriage 25a, a suspension 25b, a drive coil 25c, a permanent magnet 25d, and so on.

The carriage 25a is means of rocking around a fulcrum at point c.

The suspension 25b is attached to the carriage 25a, and is means of maintaining the magnetic head 24 in a levitated state a few tens nanometers above the surface of the magnetic disk 23 by means of a levitation mechanism called a slider.

The drive coil 25c is means of generating a driving force in cooperation with the permanent magnet 25d arranged opposingly thereto, and thereby causing the actuator 25 to rotate or rock.

The permanent magnet 25d is means of generating the driving force in cooperation with the drive coil 25c, and thereby causing the actuator 25 to rotate or rock.

A head amplifier 27 is means of detecting and amplifying a reproduced signal from the magnetic head 24, and of amplifying a recording signal.

A controller 26 is means of: detecting the position of the magnetic head 24 relatively to the magnetic disk 23 on the basis of the output from the head amplifier 27; outputting to a driver 28 a control signal for positioning the actuator 25 to a predetermined position on the magnetic disk 23; converting a signal read from the output of the head amplifier 27, into digital data; and converting digital data to be recorded, into a signal to be written in, and then providing the signal to the head amplifier 27.

A driver 28 is means of providing a current corresponding to the control signal, to the actuator 25.

An interface 29 is means of transmitting and receiving digital information to and from the PC 60.

A buffer cache 30 is means of storing such information and thereby improving the efficiency of the recording and reproducing in the magnetic disk 23.

Although not shown in the figure, the system further comprises: a spindle motor for driving the revolution of the magnetic disk 23; a buffer control unit for controlling the buffer cache 30; and an information recording and reproducing circuit.

FIG. 14 shows the magnetic disk 23. The surface of the magnetic disk 23 is partitioned into tracks 62 each of which is a concentric region for recording data. Each track 62 is, in turn, partitioned into sectors 63. Each track 62 is provided with a sequential track number starting from the inside or the outside. Accordingly, each recording segment on the magnetic disk 23 is specified by the combination of a track number and a sector number. As such, in the HDD 10, access is carried out on a sector 63 basis. Accordingly, when a set of AV data is composed of a plurality of sectors 63, these sectors 63 are not necessarily arranged within the same track 62 or within adjacent tracks 62. That is, in some cases, a set of AV data can be distributed into non-consecutive sectors 63.

Further, the magnetic disk 23 has a region called an alternate region in addition to the recording region for AV data. Sectors within the alternate region are called alternate sectors. The alternate region is provided, for example, in the inner circumference portion of the magnetic disk 23. The alternate sectors are used as replacements of defective sectors, when defective sectors in which recording and/or reproducing are not carried out normally occur in the magnetic disk 23.

Described below is the operation of the prior art system for recording and reproducing AV data.

First, described below is the operation of recording to and reproducing from the magnetic disk 23 by the HDD 10.

In the recording or reproducing of AV data, the magnetic head 24 moves to (seeks) a track where AV data is recorded. Then, the magnetic head 24 waits for the rotation of the magnetic disk 23 until an appropriate sector for recording or reproducing comes under the magnetic head 24. After that, the recording or reproducing of the AV data is started.

At this time, consecutive sectors can be read out continuously without magnetic head 24 movement or rotation waiting. In contrast, read-out from non-consecutive sectors needs the three repeated processes of magnetic head 24 movement, rotation waiting, and data read-out. That is, the time of magnetic head 24 movement and rotation waiting, during which data cannot be read is necessary as an extra time, in comparison with the case of consecutive sectors.

Thus, when a large amount of data such as video and audio data is transferred successively for a long time, and when the data is recorded and reproduced, the data is recorded in a distributed manner over a plurality of tracks. This causes the necessity of track jump actions (seek actions) from a track to another track and rotation waiting, during the recording and reproducing. Since recording and reproducing data is not performed at all in such a period, the rate of recording and reproducing a large amount of data which is transferred successively is reduced, and the transfer performance is degraded.

When the track jump action is carried out normally, the next recording or reproducing can be started after the above-mentioned time. Nevertheless, settling operation for damping residual oscillation after the track jump takes a substantial time in some cases. During this operation, the starting point for the next recording or reproducing can pass by. In this case, the system needs to wait for the next turn of disk rotation. This degrades the transfer performance further.

Accordingly, in the recording and reproducing of video and audio data, continuous transfer performance is essential, because in the above-mentioned cases, the video and audio reproduction can stop temporarily (frame drop)

Described below is an example of operation in which continuous transfer performance of AV data is ensured. In this example, the PC 60 records AV data into the HDD 10, and at the same time, reproduces the AV data having been recorded in the HDD 10.

When AV data is recorded and reproduced as an MPEG-2 transport stream, the PC 60 transfers the data to the HDD 10 on a GOP (group of picture) basis.

That is, in the recording of AV data transmitted from an external device at a rate of 30 frames per second, the PC 60 stores the AV data successively into a buffer 76 provided in the main memory.

Then, when a complete GOP is stored in the buffer 76, the PC 60 transfers the GOP to the interface 29 of the HDD 10, and then issues a record command.

FIG. 15(*a*) shows a 1GOP 64 as an example of a GOP. A GOP is treated as a unit in the editing of AV data, and includes necessarily an I-frame. In the example shown in FIG. 15(*a*), the 1GOP 64 contains the frames of I, B, B, P, B, . . . in this order. A GOP contains AV data for 0.5 second or the like. That is, when the AV data is at the rate of 30 frames per second, each GOP contains 15 frames. In case of AV data for ordinary resolution televisions, the size of a GOP is generally from 512 Kbytes to 1 Mbytes. In case of AV data for high definition televisions, the size is from 1.5 Mbytes to 2 Mbytes.

The size of a GOP is variable. Thus, when the PC 60 transfers the AV data of the 1GOP 64 to the HDD 10, fixed length data is formed by adding dummy data 65 to the 1GOP 64, as illustrated by a fixed length block 66 in FIG. 15(*b*). The PC 60 transfers the fixed length block 66 to the interface 29.

In case of AV data for ordinary resolution televisions, the size of the fixed length block 66 is assumed to be, for example, 1 Mbytes. In case of AV data for high definition televisions, the size of the fixed length block 66 is assumed to be, for example, 2 Mbytes.

On receiving the record command issued from the PC 60 via the interface 29, the controller 26 records the data of the fixed length block 66 onto the magnetic disk 23.

In contrast, in the reproducing of the AV data, the PC 60 issues a read command to the interface 29.

On receiving the read command issued from the PC 60 via the interface 29, the controller 26 reads out the data of a fixed length block 66 having the structure shown in FIG. 15(*b*), from the magnetic disk 23.

The PC 60 receives the data read out by the controller 26 from the interface 29, and temporarily stores the data of the fixed length block 66 composed of the 1GOP 64 and the dummy data 65, into the buffer 76. The PC 60 then carries out the AV decoding of the 1GOP 64 portion alone stored in the buffer 76, at the rate of 30 frames per second or the like, and thereby displays the data on the monitor connected to the PC 60.

FIG. 15(*c*) shows a time chart of simultaneous recording and reproducing of fixed length blocks 66 each composed of a 1GOP 64 and dummy data 65.

In the prior art system, the operation is divided into time intervals of length T (T indicates a predetermined time length). The PC 60 controls the HDD 10 so as to record and reproduce the data once in each time interval T. That is, as shown in FIG. 15(*c*), the PC 60 controls the HDD 10 so as to record a fixed length block 66*a* and reproduce a fixed length block 66*b* in a time interval T.

FIG. 16 shows reproducing operation. In the reproducing, the PC 60 controls the HDD 10 so as to read out the AV data stored on the magnetic disk 23 on a fixed length block 66 basis. The PC 60 reads out the data of a fixed length block 66 once in a time interval T as indicated by read-out 68*a*, and then stores the data in the buffer 76. Also in the next time interval T, the PC 60 reads out the data of a fixed length block 66 once as indicated by read-out 68*b*, and then stores the data in the buffer 76. Further, in the second next time interval T, the PC 60 reads out the data of a fixed length block 66 once as indicated by read-out 68*c*, and then stores the data in the buffer 76.

At the same time, the PC 60 successively reads and decodes the AV data stored in the buffer 76. That is, the PC 60 successively reads and decodes the data on a 1GOP (containing the AV data of 15 frames, in this prior art example) basis, as indicated by output 69*a*, 69*b*, and 69*c*.

As such, the PC 60 controls the HDD 10 so as to record and reproduce the data once in each time interval T on a fixed length block 66 basis.

Even in a more general case of multi-channel processing in which the PC 60 and the HDD 10 record and reproduce, for example two channels of AV data simultaneously, the PC 60 controls the HDD 10 so as to record and reproduce the data of each channel once in each time interval T.

In such multi-channel processing by the PC 60, the processing is carried out cyclically for each channel in an order previously determined by the PC 60. This situation is described below for the case of multi-channel processing for four channels.

Here, process A indicates the process of recording (or reproducing) of AV data 1. Process B indicates the process of recording (or reproducing) of AV data 2. Process C indicates the process of recording (or reproducing) of AV data 3. Process D indicates the process of recording (or reproducing) of AV data 4.

The PC 60 carries out the processes A, B, C, and D of recording into (or reproducing from) the HDD 10 in this order in a time interval T on a fixed length block 66 basis. Also in the next time interval T, the PC 60 carries out the processes A, B, C, and D of recording into (or reproducing from) the HDD 10 in this order on a fixed length block 66 basis. Further, in the second next time interval T, the PC 60 carries out the processes A, B, C, and D in this order.

As such, in multi-channel processing by the PC 60, the processing is carried out cyclically for each channel in each time interval T in the predetermined order.

That is, even in multi-channel processing in which the PC 60 and the HDD 10 record and reproduce multi-channel AV data, the PC 60 controls the HDD 10 so as to record and reproduce the data of each channel once in each time interval T in a predetermined order, whereby continuous transfer of the AV data is ensured for each channel.

As described above, the PC 60 controls the HDD 10 so as to record and reproduce the AV data of each channel once and only once in each time interval T on a fixed length block 66 basis. At that time, when it takes a longer time in recording to or reproducing from the magnetic disk 23 than normal cases, such a case can occur that the recording or reproducing of the data of a fixed length block 66 is not completed during the time interval T. An example of such cases is that a defective sector is found during the recording or reproducing in the magnetic disk 23 of the HDD 10, and that the HDD 10 retries the process.

In such a case, as shown in the time chart of FIG. 17(*a*), the process of recording or reproducing in the HDD 10 continues after the elapse of time T. Thus, the delay time interval 70 has a time length of T' longer than T. This delay propagates to the subsequent processes of recording and reproducing.

In another case, as shown in FIG. 17(*b*), in a delay time interval 71, a recording process has been delayed, whereby the subsequent reproducing process cannot complete during the time interval T. This causes a drop in the data as indicated by a drop 72.

In any case, when recording and/or reproducing processes are not completed during the time interval T, caused is a drop in the data or a delay in the subsequent processes of recording and reproducing.

FIG. 18 shows reproducing operation in case that the process has been delayed as described above. The data of a fixed length block 66 is not read out from the HDD 10 as indicated by read-out 73. In spite of this, the data of the fixed length block 66 needs to be output as indicated by output 74. Thus, a drop occurs in the AV data output from the PC 60. That is, when a recording or reproducing process in the magnetic disk 23 is not completed during the time interval T, a drop occurs in the AV data during the recording or reproducing process. This impairs continuous transfer of the AV data.

Further, as mentioned above, defective regions occur in the magnetic disk 23 by aging and the like during the use of the HDD 10.

Described below is the management of such defective regions carried out by the PC 60 and the HDD 10.

The PC 60 and the HDD 10 are provided with error recovery functions in order to improve the reliability in recording and reproducing.

Such error recovery functions include: a retry process in which recording or reproducing is retried in the region where an error has occurred; and an alternation process and an LBA reassignment process in which the LBA having been assigned to the region where an error has occurred is reassigned to another region, whereby the use of the region where an error has occurred is terminated.

The retry process carried out by the HDD 10 is described below first.

When an error has occurred during the recording or reproducing of a sector indicated by an LBA specified by the PC 60, the controller 26 moves the magnetic head 24 slightly, and then retries the recording or reproducing. Such retry processes are repeated a predetermined times until normal recording or reproducing is achieved.

In case that normal recording or reproducing is not achieved even after the retry processes of the predetermined times, the controller 26 determines the sector as defective, and thereby invokes an alternation process described below. The alternation process is carried out within the HDD 10.

FIG. 19 illustrates an alternation process. FIG. 19(*a*) shows the correspondence between LBAs and magnetic disk 23 regions before the alternation process. FIG. 19(*b*) shows the correspondence between LBAs and magnetic disk 23 regions after the alternation process. FIG. 19(*c*) shows the magnetic disk 23.

In order to record or reproduce AV data to or from the HDD 10, the PC 60 notifies an LBA to be recorded or reproduced, to the HDD 10. The controller 26 of the HDD 10 carries out the recording or reproducing the data in a sector specified by the LBA. That is, the controller 26 has a table of correspondence between LBAs and magnetic disk 23 regions.

In normal recording or reproducing, the correspondence table is as shown in FIG. 19(*a*). That is, LBAs 1-6 sequentially correspond to the sectors in a region A of the magnetic disk 23. An LBA 7 corresponds to a sector B of the magnetic disk 23. LBAs 8-12 sequentially correspond to the sectors in a region C of the magnetic disk 23.

It is assumed that an error has occurred during the recording to the LBA 7. That is, during the recording to the sector B, data was not recorded normally even after the retry processes of the predetermined times. Alternatively, it is assumed that during the reproducing from the sector B, retry processes have been repeated the predetermined times or more.

In such a case, the controller 26 determines the sector B of the magnetic disk 23 as defective, and thereby updates the above-mentioned correspondence table so that an alternate sector B' in the alternate region is used in place of the sector B.

As described above, the magnetic disk 23 is provided with a predetermined region used for alternation processes. A sector within this region is used as an alternate sector in an alternation process.

That is, as shown in FIG. 19(*b*), the correspondence table is updated such that the LBA 7 indicates the sector B'.

After this process, when receiving from the PC 60 an instruction of recording or reproducing in LBA 7, the controller 26 carries out the recording or reproducing in the sector B' instead of the sector B.

As such, in the alternation process, when a defective sector is found, the controller 26 updates the correspondence table between LBAs and magnetic disk 23 sectors, whereby after that, an alternate sector in the alternate region is used instead of the defective sector.

As a result of the alternation process, such a separate sector B' as shown in FIG. 19(*c*) is assigned to the LBA. This causes seek actions even in the access to consecutive LBAs, and hence degrades the continuous transfer performance in the hard disk apparatus.

FIG. 20 illustrates an LBA reassignment process carried out by the PC 60. During this reassignment process, the function of alternation process in the HDD 10 is turned off. FIG. 20(*a*) shows the result of an LBA reassignment process carried out when the sector indicated by the LBA 7 was defective similarly to the case of FIG. 19(*b*).

That is, the PC 60 has an LBA correspondence table shown in FIG. 20(*a*). This table corresponds LBAs used in the PC 60 to LBAs used in the HDD 10.

The sector corresponding to the LBA 7 is defective. Accordingly, access to the LBA 7 causes an access error.

When the number of such defective sectors increases to a certain level, an LBA reassignment process is carried out. The LBA reassignment process avoids the use of the defective sector B. That is, LBAs used in the PC 60 are corresponded to LBAs used in the HDD 10 as shown in FIG. 20(*a*). This avoids the use of the defective sector B. Further, the LBA correspondence table is generated such that the LBAs used in the PC 60 correspond to the sectors in the order of disk rotation. By virtue of this, when the PC 60 accesses the LBAs sequentially, the sectors are accessed sequentially in the order of disk rotation with skipping the defective region. This avoids the necessity of seek actions.

Nevertheless, in the prior art system for recording and reproducing AV data, when the recording is carried out on a GOP basis, recording data of fixed size is generated by adding dummy data to the GOP. This increases the size of the data, and thereby causes an idle time in the data transfer, in comparison with the case of the GOP alone.

That is, there has been the problem that the recording on a GOP basis needs adding of dummy data, and that this increases the size of the data, and thereby causes an idle time in the data transfer.

Further, there has been the problem that when the recording or reproducing is not completed during the predetermined time interval, the buffer action becomes incomplete, whereby a drop occurs in the recorded or reproduced AV data.

Furthermore, in the management of defective regions, an alternation process assigns an LBA to a separate sector as illustrated by the LBA 7 in FIG. 19(b). This causes the necessity of seek actions even in the access to consecutive LBAs. Accordingly, when the alternation processes are repeated, the number of necessary seek actions increases and thereby degrades the performance of recording and reproducing in the hard disk apparatus.

That is, there has been the problem that the alternation process degrades the performance of recording and reproducing in the hard disk apparatus.

In order to resolve the above-mentioned problems, the PC carries out an LBA reassignment process as described above. Nevertheless, this LBA reassignment process takes a long time because the data already recorded in the sectors needs to be moved to another sectors. That is, there has been the problem that the LBA reassignment process needs a long time.

DISCLOSURE OF INVENTION

The present invention has been devised with considering the problem that the recording on a GOP basis needs adding of dummy data, and that this increases the size of the data, and thereby causes an idle time in the data transfer. An object of the invention is to provide a hard disk apparatus, a recording/reproducing method, a medium, and a program capable of avoiding an idle time in data transfer.

Further, the invention has been devised with considering the problem that when the recording or reproducing is not completed during a predetermined time interval, the buffer action becomes incomplete, whereby a drop occurs in the recorded or reproduced AV data. An object of the invention is to provide a hard disk apparatus, a recording/reproducing method, a medium, and a program in which even when the recording or reproducing of AV data is delayed, the delay is recovered, whereby no drop occurs in the AV data.

The invention has been devised with considering the problem that in the management of defective regions, the alternation process degrades the performance of recording and reproducing in the hard disk apparatus. An object of the invention is to provide a hard disk apparatus, an access method, a medium, and a program in which in the management of defective regions, the alternation process does not degrade the performance of recording and reproducing in the hard disk apparatus.

The invention has been devised with considering the problem that in the management of defective regions, the LBA reassignment process needs a long time. An object of the invention is to provide a hard disk apparatus, an access method, a medium, and a program in which in the management of defective regions, LBA reassignment is unnecessary.

To solve the problem described above, one aspect of the present invention is a hard disk apparatus comprising:

recording means of recording AV data onto a hard disk; and stream controlling means which is connected to the recording means and thereby processes the signal of AV data transmitted from an interface or the signal of AV data transmitted to the interface; whereby the hard disk apparatus can record and/or reproduce the AV data, wherein when AV data transfer is not normally completed for a disk access unit which is a minimum continuous unit in the access to the hard disk and has a size ensuring real-time transfer of the AV data, an alternation process on a disk access unit basis is carried out so that another disk access unit is used hereafter in place of that disk access unit.

Another aspect of the present invention is a hard disk apparatus, wherein the case that the transfer is not normally completed indicates the case that the number of events that the AV data transfer is not normally completed for the disk access unit within a predetermined time interval exceeds a predetermined value.

Still another aspect of the present invention is a hard disk apparatus, wherein when the AV data transfer is not normally completed for a sector on the hard disk, the recording means carries out an alternation process on a sector basis so that another sector is used hereafter in place of the sector in which the transfer is not normally completed.

Yet still another aspect of the present invention is a hard disk apparatus comprising:

recording means of recording AV data onto a hard disk; and stream controlling means which is connected to the recording means and thereby processes the signal of AV data transmitted from an interface or the signal of AV data transmitted to the interface; whereby the hard disk apparatus can record and/or reproduce the AV data in multi-channel processing, wherein:

in the recording, in the timing that the AV data transmitted from the interface is accumulated to a predetermined size in a buffer in the stream controlling means, the stream controlling means generates a write request for causing the data having the predetermined size accumulated in the buffer to be transferred to the recording means, and then the recording means records the data having the predetermined size; and in the reproducing, in the timing that the data having the predetermined size is read out from the buffer in the stream controlling means into the interface, the stream controlling means generates a read request for causing the data to be transferred from the recording means, and then the recording means reads out the data having the predetermined size and thereby stores the data into the buffer.

Still yet another aspect of the present invention is a hard disk apparatus according to the 4th invention, wherein the stream controlling means issues transfer commands corresponding to the write and read requests to the recording means, in the order of reception of the requests.

A further aspect of the present invention is a hard disk apparatus, wherein the stream controlling means issues transfer commands corresponding to the write and read requests to the recording means, in the order of predetermined priority.

A still further aspect of the present invention is a hard disk apparatus, wherein the data having the predetermined size has a fixed length.

A yet further aspect of the present invention is a hard disk apparatus, wherein the fixed length is an integer multiple of the byte number of a sector.

A still yet further aspect of the present invention is a hard disk apparatus, wherein:

the AV data is an MPEG transport stream; and the data having the predetermined size is composed of a header and a predetermined number of time-stamped packet data pieces each generated by adding a time stamp to a transport packet of the AV data.

An additional aspect of the present invention is a computer-processable medium carrying a program and/or data for causing a computer to execute all or part of the function of all or part of the means constituting a hard disk apparatus.

A still additional aspect of the present invention is an information set serving as a program and/or data for causing a computer to execute all or part of the function of all or part of the means.

BRIEF DESCRIPTION OF DRAWINGS

FIG. 6(*b*) shows the record format of a disk access unit according to Embodiment 1 of the invention.

FIG. 11 shows a correspondence table for corresponding each LBA to the combination of a track and a sector according to Embodiment 2 of the invention.

FIG. 12(*a*) shows a DAU management table according to Embodiment 2 of the invention.

FIG. 12(*a*) shows a DAU conversion table according to Embodiment 2 of the invention.

FIG. 15(*b*) illustrates that a prior art HDD unit carries out recording on a GOP basis.

FIG. 15(*c*) is a time chart of a prior art HDD unit which carries out recording and reproducing simultaneously.

FIG. 17(*b*) is another time chart of a prior art HDD unit in the case when a delay has occurred in recording or reproducing in the magnetic disk.

FIG. 19(*b*) shows the correspondence between LBAs and magnetic disk regions in a prior art HDD unit after an alternation process.

FIG. 19(*c*) shows the configuration of magnetic disk regions.

FIG. 20(*b*) shows the configuration of magnetic disk regions.

DESCRIPTION OF THE REFERENCE NUMERALS

Figure 1:
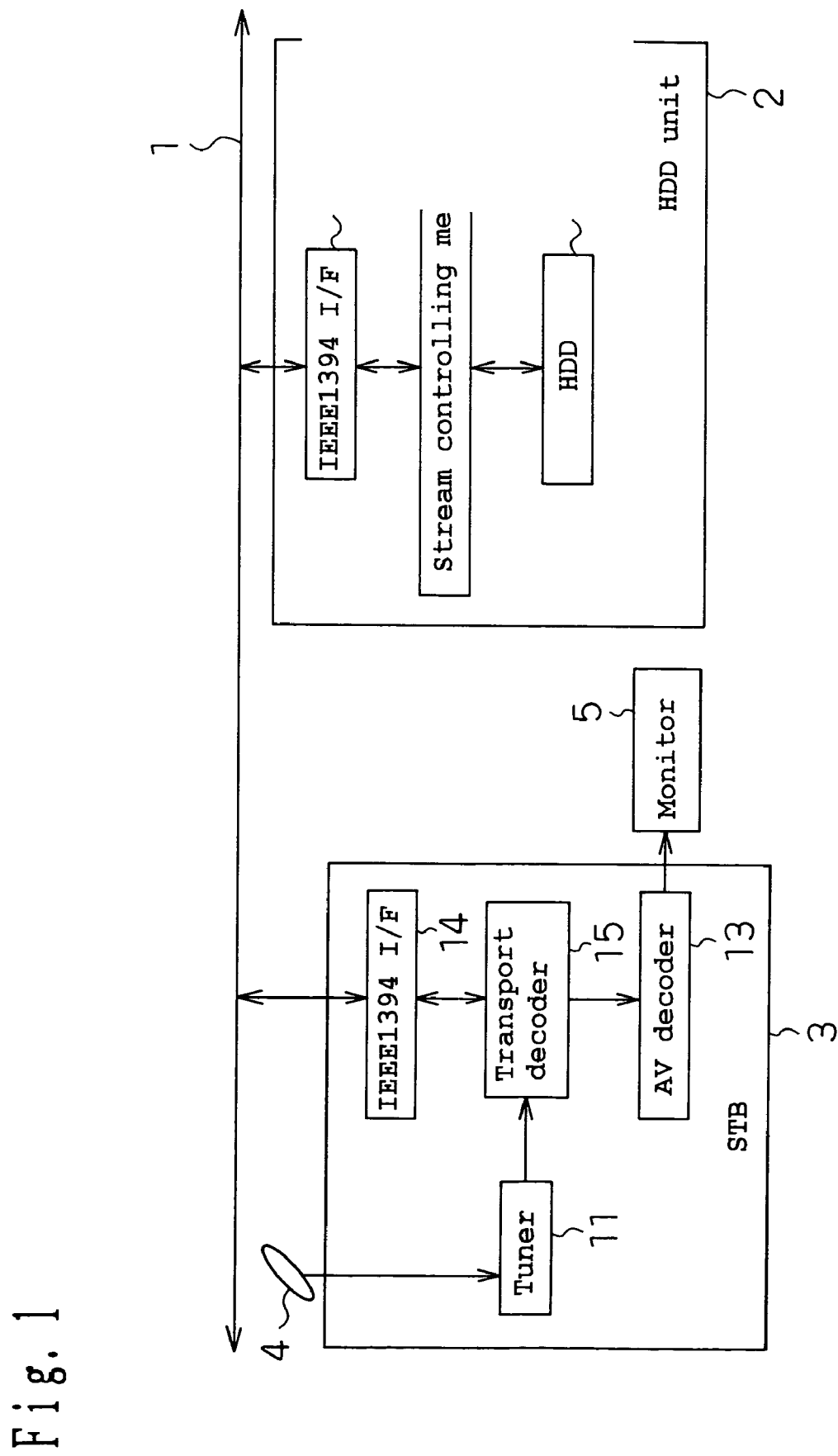
FIG. 1 is a block diagram showing the configuration of an HDD unit according to Embodiment 1 of the invention.

1 IEEE1394 bus
2 HDD unit
3 STB
4 Antenna
5 Monitor
7 IEEE1394 I/F
8 Stream controlling means
10 HDD
11 Tuner
13 AV decoder
14 IEEE1394 I/F
15 Transport decoder
16 Recording signal processing means
17 Reproduced signal processing means
18 Transfer controlling means
19 Buffer RAM
20 Microprocessor
21 Recording and reproducing port
23 Magnetic disk
24 Magnetic head
25 Actuator
26 Controller
27 Head amplifier
28 Driver
29 Interface
30 Buffer cache
36*a*-36*c* Waiting time for rotation
37 Worst process time in a unit

BEST MODE FOR CARRYING OUT THE INVENTION

The embodiments of the invention are described below with reference to the drawings.

Embodiment 1

Embodiment 1 is described below first.

FIG. 1 shows a system containing an HDD unit 2 serving as an embodiment of a hard disk apparatus according to the invention.

The HDD unit 2 is connected to an IEEE1394 bus 1. An STB 3 is also connected to the IEEE1394 bus 1. The STB 3 is further connected to an antenna 4 and a monitor 5.

The IEEE1394 bus 1 relays the transfer of AV data and the exchange of commands, and is based on the IEEE standard for high performance serial bus defined in IEEE1394-1995.

The HDD unit 2 exchanges AV data with the STB 3 via the IEEE1394 bus 1, and thereby records and reproduces the AV data.

The STB 3 is a set top box (receiver for satellite broadcasting) for receiving radio waves transmitted from broadcasting stations, displaying the received AV data onto the monitor 5, transferring the received AV data to the IEEE1394 bus 1, and displaying the AV data received from the IEEE1394 bus 1 onto the monitor 5.

The HDD unit 2 comprises an IEEE1394 I/F 7, stream controlling means 8, and an HDD 10.

Figure 2:
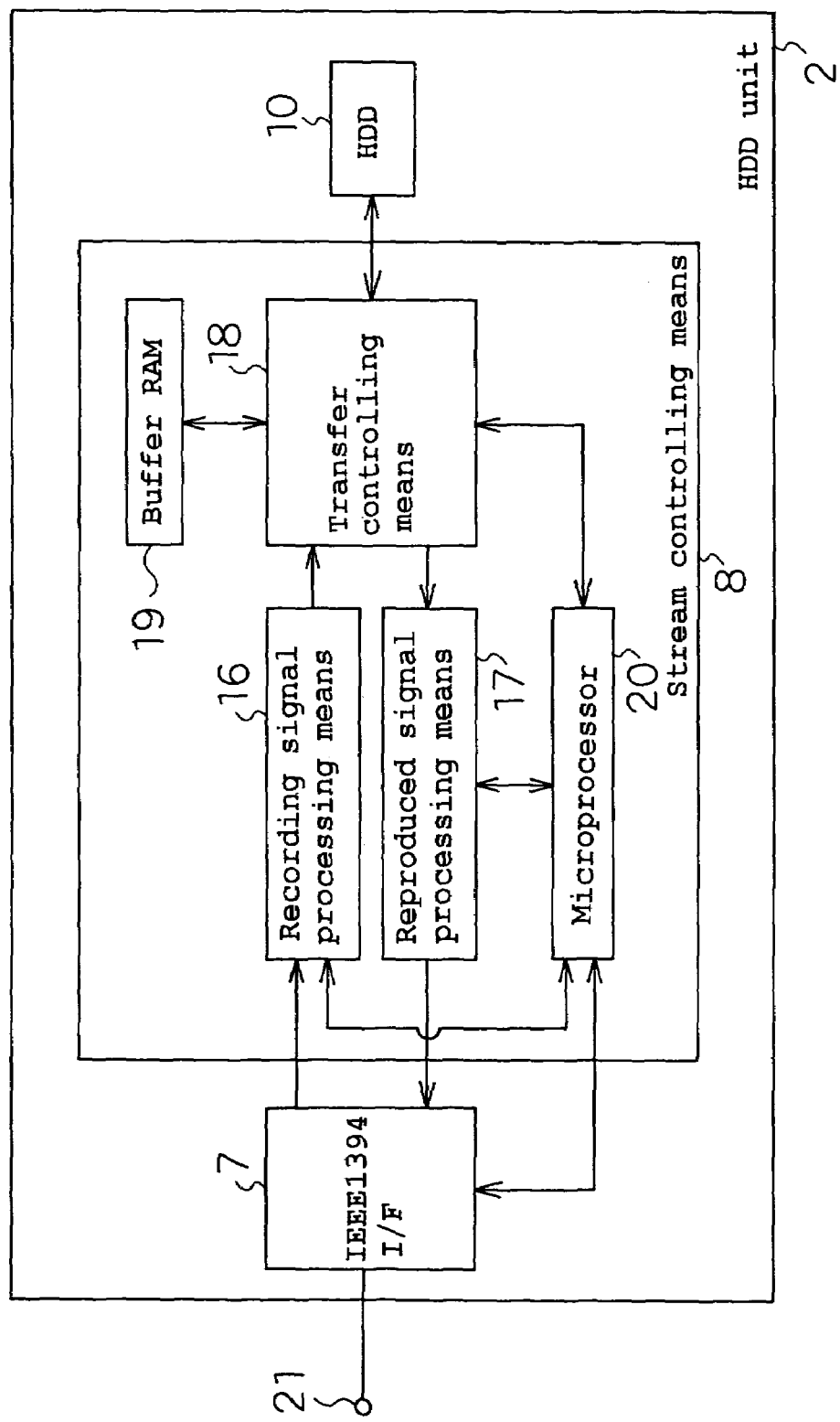
FIG. 2 is a block diagram showing the detailed configuration of an IEEE1394 I/F and stream controlling means according to Embodiment 1 of the invention.

FIG. 2 shows a detailed partial configuration of the stream controlling means 8 of the HDD unit 2.

The IEEE1394 I/F 7 comprises a recording and reproducing port 21.

The stream controlling means 8 comprises recording signal processing means 16, reproduced signal processing means 17, transfer controlling means 18, a buffer RAM 19, and a microprocessor 20.

Figure 3:
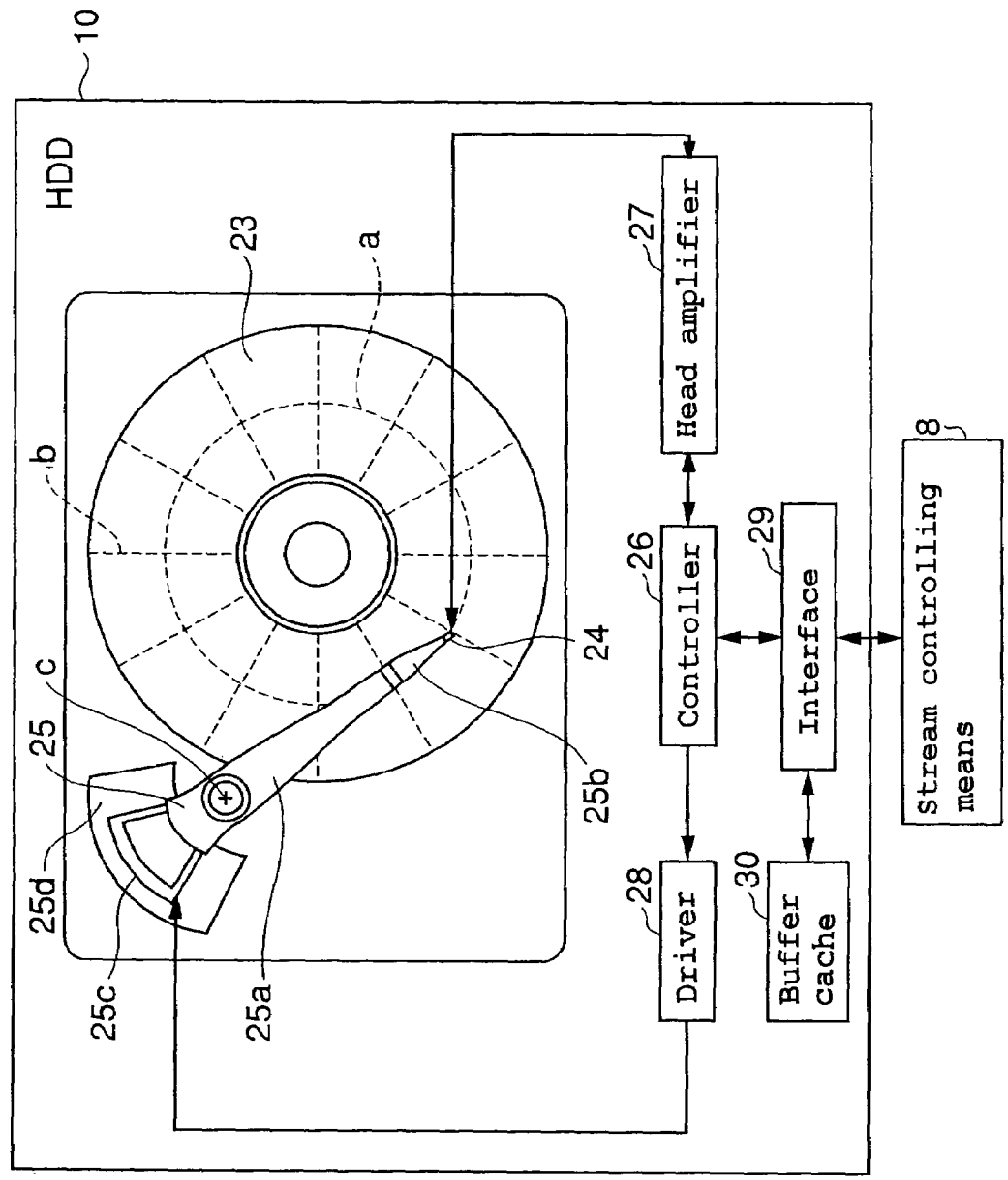
FIG. 3 is a block diagram showing the detailed configuration of an HDD according to Embodiment 1 of the invention.

FIG. 3 shows the detailed configuration of the HDD 10.

The HDD 10 comprises a controller 26, a head amplifier 27, a driver 28, an interface 29, a buffer cache 30, a magnetic disk 23, a magnetic head 24, and an actuator 25. The HDD 10 is identical to that in the description of the prior art.

In FIG. 1, the STB 3 comprises a tuner 11, a transport decoder 15, an AV decoder 13, and an IEEE1394 I/F 14.

In FIG. 2, the IEEE1394 I/F 7 in the HDD unit 2 is an interface that exchanges commands and AV data with external devices via the IEEE1394 bus 1.

The recording and reproducing port 21 is connected to the IEEE1394 bus 1.

The stream controlling means 8 specifies an LBA (logical block address) and thereby accesses the magnetic disk 23, and can simultaneously process AV data of two channels or more.

The recording signal processing means 16 in the stream controlling means 8 analyzes the input MPEG-2 transport stream, and thereby generates special reproduction information. This means further adds a time stamp for accumulation to each transport packet in the MPEG-2 transport stream, and then transfers the packet to the transfer controlling means 18.

The reproduced signal processing means 17 separates the time stamp for accumulation added to each transport packet in the MPEG-2 transport stream transferred from the transfer controlling means 18, and then transfers the transport packet to the IEEE1394 I/F 7 in the time interval indicated by the time stamp. In case of special reproduction, the reproduced signal processing means 17 rearranges the MPEG-2 transport stream transferred from the transfer controlling means 18 so as to match with the MPEG-2 grammar, and thereby generates data for special reproduction.

In the recording of AV data, the transfer controlling means 18 temporarily stores, into the buffer RAM 19, the MPEG-2 transport stream and the special reproduction information transmitted from the recording signal processing means 16. When the amount of the data accumulated in the buffer RAM 19 reaches the amount of a disk access unit, the transfer controlling means 18 issues, to the HDD 10, a command specifying the start LBA and the number of sectors of a disk access unit, which is to be written, and thereby transfers the data accumulated in the buffer RAM 19 by the amount of a disk access unit, to the HDD 10. In contrast, in the reproducing of AV data, when the data stored in the buffer RAM 19 is transferred to the reproduced signal processing means 17 by the amount of a disk access unit, the transfer controlling means 18 issues, to the HDD 10, a command specifying the start LBA and the number of sectors of a disk access unit, which is to be read, and thereby stores the data read out by the HDD 10 by the amount of a disk access unit, into the buffer RAM 19.

The buffer RAM 19 is a synchronous dynamic RAM for storing data temporarily.

The microprocessor 20 controls the processes of the IEEE1394 I/F 7, the stream controlling means 8, the recording signal processing means 16, the reproduced signal processing means 17.

The controller 26 in the HDD 10 corresponds the specified LBA to a track and a sector, controls the actuator 25 and the spindle motor, and positions the magnetic head 24. As such, the controller 26 controls the recording and reproducing operation of the magnetic head 24 to and from the magnetic disk 23. More specifically, the controller 26 detects the position of the magnetic head 24 relative to the magnetic disk 23 on the basis of the output of the head amplifier 27, and thereby outputs, to the driver 28, a control signal for positioning the actuator 25 at a predetermined position on the magnetic disk 23. Further, the controller 26 converts the signal from the output of the head amplifier 27, into digital data. The controller 26 further converts digital data to be recorded, into a signal to be written, and thereby provides the signal to the head amplifier 27.

The head amplifier 27 detects and amplifies the reproduced signal from the magnetic head 24. The head amplifier 27 further amplifies the recording signal.

The driver 28 provides a current corresponding to the control signal, to the actuator 25.

The interface 29 exchanges information including commands from the transfer controlling means 18 or data.

The buffer cache 30 stores such information and thereby recording and reproducing in the magnetic disk 23 with high efficiency.

The magnetic disk 23 is a magnetic recording medium for recording data.

The magnetic head 24 records and reproduces information to and from the magnetic disk 23.

The actuator 25 carries the magnetic head 24 at the tip and thereby positions the magnetic head 24 at an arbitrary radial position on the magnetic disk 23.

Although not shown in the figure, the system further comprises: a spindle motor for driving the revolution of the magnetic disk 23; and a buffer control unit for controlling the buffer cache 30.

In FIG. 1, the IEEE1394 I/F 14 in the STB 3 exchanges AV data and commands with external devices connected to the IEEE1394 bus 1, via the IEEE1394 bus 1.

The tuner 11 receives and demodulates BS broadcasting.

The transport decoder 15 separates the MPEG-2 transport stream.

The AV decoder 13 expands the compression of the separated AV data, and thereby converts the data into an analogue signal.

Each sector in the magnetic disk 23 has a length of 512 bytes. The stream controlling means 8 reads and writes data, for example, from and to consecutive 4096 sectors in the magnetic disk 23 at a time. A disk access unit herein indicates such a region of magnetic disk 23 from and to which the stream controlling means 8 reads and writes data at a time.

The HDD unit 2 according to the present embodiment is an example of a hard disk apparatus according to the invention. The HDD 10 according to the present embodiment is an example of recording means according to the invention. The IEEE1394 I/F 7 according to the present embodiment is an example of an interface according to the invention.

Described below is the operation of a system according to the present embodiment.

The operation of positioning the magnetic head 24 is described below first.

In the recording and reproducing of AV data, the magnetic disk 23 is rotated at a constant rate by a spindle motor not shown.

The magnetic head 24 is positioned by the actuator 25.

Each concentric track (a track "a" is indicated by a broken line in the figure) on the magnetic disk 23 is provided with position information ("b" in the figure) in advance. The position information "b" is recorded on each track at a predetermined spacing. Accordingly, the magnetic head 24 reproduces the position information "b" in each time interval as the magnetic disk 23 rotates.

The reproduced signal from the magnetic head 24 is detected and amplified by the head amplifier 27, and then input to the controller 26. The controller 26 recognizes the position information on the basis of the input signal, and then calculates the position error of the magnetic head 24 relative to the target track "a". The controller 26 further calculates the amount of control necessary for driving the actuator 25 in order to reduce the position error, and then outputs a control signal.

On the basis of the received control signal, the driver 28 supplies a necessary current to the drive coil 25c of the actuator 25. Accordingly, a driving force is generated between the drive coil 25c and the permanent magnet 25d arranged in the position opposing thereto. By virtue of this, the actuator 25 rotates around a point "c" so as to continuously position the magnetic head 24 on the target track "a". In this state, the magnetic head 24 records and reproduces data to and from the data region.

Figure 4:
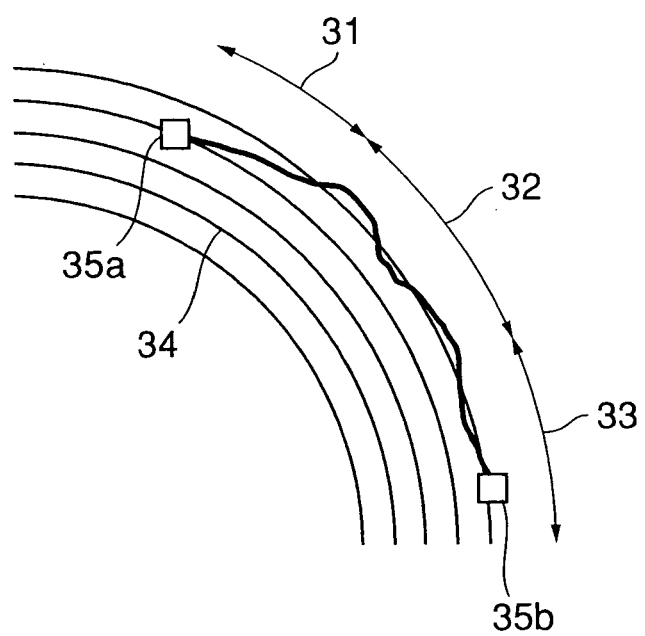
FIG. 4 illustrates seek, settling, and tracking actions according to Embodiment 1 of the invention.

In the recording and reproducing of AV data, a seek action 31 is necessary in which the magnetic head 24 moves from a track to another track as shown in FIG. 4. In the seek action 31, the magnetic head 24 rapidly moves from the present position (position 35a) to the vicinity of the target track.

Nevertheless, the magnetic head 24 suffers rocking motion after the seek action, and hence needs a settling action 32 for settling the position to the center of the target track (position 35b). After the settling action 32, the magnetic head 35b is precisely positioned. After that, the recording or reproducing of the data is carried out. During this recording or reproducing of the data, the magnetic head 35b needs to be controlled so as to be positioned precisely on the target track. The magnetic disk 23 suffers various vibration during the rotation, and the magnetic head 35b also suffers vibration. Thus, necessary is a tracking action 33 for tracking the target track. As such, the operation of positioning the magnetic head 35b includes roughly three modes, seek, settling, and tracking actions. During the seek and settling actions, the recording and reproducing of the data can not be carried out. In contrast, the recording and reproducing of the data can be carried out during the tracking action.

That is, as mentioned above in the description of the prior art, in the recording and reproducing of the AV data, the magnetic head 24 moves to (seeks) a track in which the AV data is recorded, and then waits until an appropriate sector in which the AV data is recorded or to be reproduced comes under the magnetic head 24 as the magnetic disk 23 rotates. Then, the recording and reproducing of the AV data is carried out.

Consecutive sectors can be read out continuously without the movement of the magnetic head 24 and the waiting for the disk rotation. In contrast, read-out from non-consecutive sectors needs the repeated three processes of magnetic head 24 movement, rotation waiting, and data read-out. That is, an extra time is necessary for the time of magnetic head 24 movement and rotation waiting, during which data cannot be read, in comparison with the case of consecutive sectors. Accordingly, in order to ensure the continuous transfer of AV data, the disk access unit which is the minimum unit in a continuous recording or reproducing of AV data needs to be sufficiently long the frequency of occurrence of the seek and settling actions. Time for retry processes also needs to be considered.

Described below is a method of determining the disk access unit which is the minimum unit in a continuous recording or reproducing of AV data, in a multi-channel processing case.

The size of the disk access unit is determined according to the following Formula (1).

$$Rch = \frac{D}{T} \qquad \text{(Formula 1)}$$

Here, Rch indicates the transfer rate per channel. D indicates the size of the disk access unit to be determined. T indicates the process time necessary for recording or reproducing the data of size D.

That is, Formula (1) gives transfer rate Rch when the size of the disk access unit is D.

In case of AV data for ordinary resolution televisions, necessary transfer rate is 15 Mbps or the like. In case of AV data for high definition televisions, necessary transfer rate is 30 Mbps or the like. Accordingly, when Formula (1) gives Rch of 30 Mbps or higher, AV data can be continuously transferred in both cases of ordinary resolution televisions and of high definition televisions. At that time, the size of the disk access unit is set to be D.

Described below is a method of calculating T in Formula (1). T is set to be the greater value between T1 obtained from the following Formula (2) and T2 obtained from the following Formula (3).

$$T_1 = \frac{D}{Ri} \times C + W \times C + S_{st} \times C \qquad \text{(Formula 2)}$$

Here, T1 indicates the process time necessary for recording or reproducing the data of transfer size D to or from the inner circumference of the magnetic disk 23. D indicates transfer size. Ri indicates the rate of recording to or reproducing from the inner circumference of the magnetic disk 23. C indicates the number of channels in the multi-channel processing. Sst indicates the time necessary for a settling action. W indicates the time of rotation waiting.

$$T_2 = (C \div 2)\left(\frac{D}{Ri} + \frac{D}{Ro}\right) + (C\%2)\frac{D}{Ri} + W \times C + (S_{fsk} + S_{st}) \times C \quad \text{(Formula 3)}$$

Here, T2 indicates the process time necessary for recording or reproducing the data of transfer size D to or from both the inner circumference and the outer circumference of the magnetic disk 23. D indicates transfer size. Ri indicates the rate of recording to or reproducing from the inner circumference of the magnetic disk 23. Ro indicates the rate of recording to or reproducing from the outer circumference of the magnetic disk 23. C indicates the number of channels in the multi-channel processing. Sst indicates the time necessary for a settling action. Sfsk indicates the time necessary for a full stroke. W indicates the time of rotation waiting. In the arithmetic operation ÷ in Formula (3), a dividing operation is carried out, and the quotient alone is adopted, whereas the remainder is neglected. In the arithmetic operation % in Formula (3), a dividing operation is carried out, and the remainder alone is adopted, whereas the quotient is neglected.

Described below is the case of two-channel processing. That is, C=2. Further assumed is that W=11 ms, Sst=2 ms, and Sfsk=18 ms. Using these values, T1 and T2 are obtained. The greater value of the two is adopted as T. Then, Rch is obtained from Formula (1).

Figure 5:
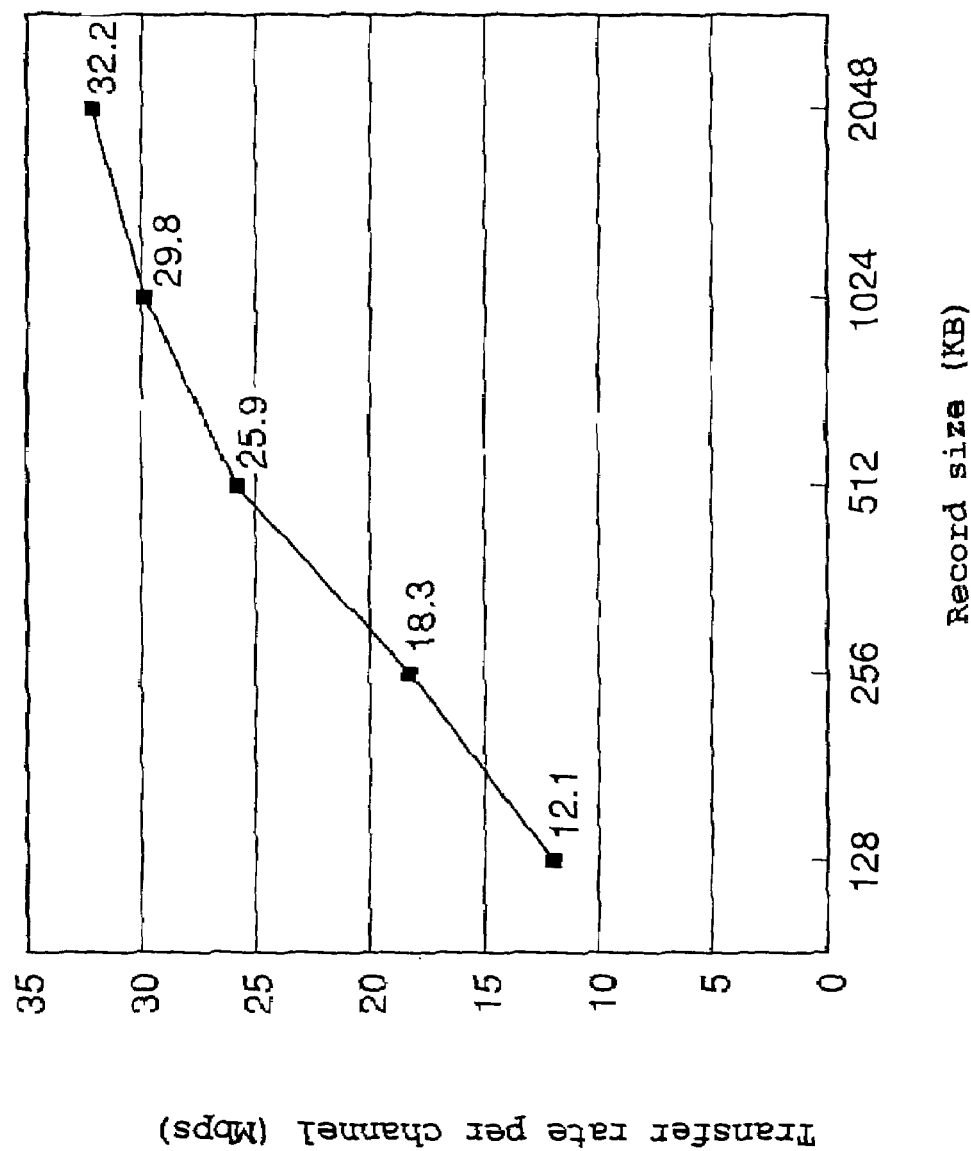
FIG. 5 shows transfer rates per channel as a function of record size according to Embodiment 1 of the invention.

FIG. 5 shows an example of the relation between D and Rch when Ri=70 Mbps and Ro=108 Mbps.

As seen from FIG. 5, the D value of 2048 Kbytes ensures the transfer rate of 30 Mbps which is necessary in case of AV data for high definition televisions. Accordingly, the size of the disk access unit is set to be 2 Mbytes in the HDD unit 2 according to the present embodiment.

The HDD unit 2 has the size of the disk access unit determined as described above. Accordingly, it is assured that AV data can be continuously transferred in both cases of ordinary resolution televisions and of high definition televisions, in multi-channel processing.

Described below is the operation of recording and reproducing in the HDD unit 2 having the disk access unit of the size ensuring the continuous transfer.

First, described below is the operation that the STB 3 receives AV data transmitted from a broadcasting station of BS broadcasting, and that the HDD unit 2 records the data.

An MPEG-2 transport stream is transmitted on radio waves from the broadcasting station of BS broadcasting. The antenna 4 converts the radio waves into an electric signal.

The tuner 11 receives and demodulates the electric signal.

The transport decoder 15 separates the MPEG-2 transport stream.

The IEEE1394 I/F 14 generates an isochronous packet from the separated MPEG-2 transport stream, and then transmits the packet to the IEEE1394 bus 1.

In the HDD unit 2, the IEEE1394 I/F 7 receives in the recording and reproducing port 21 the isochronous packet transmitted through the IEEE1394 bus 1, with identifying the channel number. The IEEE1394 I/F 7 converts the received isochronous packet into an MPEG-2 transport stream, and then transfers the transport packet successively to the recording signal processing means 16 at the timing indicated by the time stamp for transmission.

The recording signal processing means 16 adds a time stamp for accumulation to the transport packet transmitted from the IEEE1394 I/F 7. The recording signal processing means 16 further analyzes the MPEG-2 transport stream, and thereby generates special reproduction information which indicates the position of each frame which is used in case of special reproduction. The MPEG-2 transport stream provided with the special reproduction information and the time stamp as described above are output to the transfer controlling means 18.

The transfer controlling means 18 arbitrates the data transfer between the recording signal processing means 16, the reproduced signal processing means 17, and the HDD 10. When receiving the transport packet provided with a time stamp and the special reproduction information transmitted from the recording signal processing means 16, the transfer controlling means 18 stores the data temporarily into the buffer RAM 19.

In the timing that the sum between: the size of transport packets each provided with a time stamp; and the size of header information containing the special reproduction information and the like; both stored in the buffer RAM 19 reaches the size of the disk access unit of 2 Mbytes, the transfer controlling means 18 transfers to the HDD 10 the header information and the transport packets each provided with a time stamp both stored in the buffer RAM 19. At this time, the transfer controlling means 18 specifies the record start LBA and the number of sectors for recording, and thereby issues a command which instructs the HDD 10 to record the data into the magnetic disk 23. Here, the number of sectors for recording is the number of sectors of the disk access unit. The size of the disk access unit is 2 Mbytes, while the size of a sector is 512 bytes. Accordingly, the number of sectors is 4096.

The controller 26 controls the rotation speed of the spindle motor and the operation of the actuator 25. On the basis of the instruction from the transfer controlling means 18, the controller 26 processes the transferred data into a recording signal, amplifies the signal by a predetermined magnification, and then transmits the signal to the magnetic head 24.

The controller 26 controls the actuator 25, and thereby positions the magnetic head 24 to the next recording position on the magnetic disk 23. The magnetic head 24 records the signal onto the magnetic disk 23. On completion of the recording to the magnetic disk 23, the controller 26 notifies the completion of recording, to the interface 29. In response to this notification, the interface 29 notifies the completion of recording, to the transfer controlling means 18.

As such, the recording of data by the controller 26 is carried out on a fixed-length disk access unit basis.

When notified that the HDD 10 has completed the recording, the transfer controlling means 18 arbitrates again the recording signal processing means 16, the reproduced signal processing means 17, and the interface 29.

As such, the STB 3 receives the AV data transmitted from the broadcasting station of BS broadcasting, and then the HDD unit 2 records the AV data.

Described below is the operation that the AV data recorded in the HDD unit 2 is reproduced through the IEEE1394 bus 1 onto the monitor 5 connected to the STB 3.

The transfer controlling means 18 specifies the start LBA and the number of sectors of the AV data to be read out, and thereby issues a read command. The number of sectors to be read out is 4096 which is the number of sectors in the disk access unit.

On the basis of the LBA and the number of sectors specified by the transfer controlling means 18, the controller 26 in the HDD 10 controls the spindle motor and the actuator 25, and thereby positions the magnetic head 24 to the next read-out position of the AV data on the magnetic disk 23.

The magnetic head 24 reads out the signal recorded on the magnetic disk 23. The head amplifier 27 amplifies the signal by a predetermined magnification. The controller 26 converts the amplified signal into digital data. The interface 29 then transfers the read-out data to the transfer controlling means 18.

The transfer controlling means 18 stores the AV data having the size of the disk access unit transferred from the interface 29, temporarily into the buffer RAM 19. The AV data stored in the buffer RAM 19 is composed of header information and transport packets each provided with a successive time stamp. The transfer controlling means 18 successively transfers the AV data from the buffer RAM 19 to the reproduced signal processing means 17. In the timing that the AV data stored in the buffer RAM 19 is transferred to the reproduced signal processing means 17 by the size of the disk access unit of 2 Mbytes, the transfer controlling means 18 issues the next read command to the HDD 10.

The reproduced signal processing means 17 separates the time stamp added to the MPEG-2 transport packet of the AV data transmitted from the transfer controlling means 18, and then transfers the transport packet without the time stamp to the IEEE1394 I/F 7 in the timing indicated by the time stamp.

The IEEE1394 I/F 7 transmits the AV data as an isochronous packet from the recording and reproducing port 21 to the IEEE1394 bus 1.

The IEEE1394 I/F 14 in the STB 3 identifies the channel number, and then receives the isochronous packet transmitted from the IEEE1394 I/F 7. The IEEE1394 I/F 14 then converts the received ischronous packet into an MPEG-2 transport stream, and then outputs the data to the transport decoder 15.

The transport decoder 15 separates the MPEG-2 transport stream, and thereby converts the stream into a packetized elementary stream (PES).

The AV decoder 13 expands the compression of the PES, converts the data into an analogue signal, and then outputs the signal to the monitor 5.

The monitor 5 displays the AV data.

As such, the AV data recorded in the HDD unit 2 is reproduced through the IEEE1394 bus 1 onto the monitor 5 connected to the STB 3.

Described above in detail is the operation that the HDD unit 2 records and reproduces AV data.

Described below are examples of multi-channel processing. That is, an example is the operation that the AV data is recorded, and at the same time, reproduced at normal speed. Another example is the operation that the AV data is recorded, and at the same time, reproduced by special reproduction.

First, the STB 3 receives the AV data transmitted from the broadcasting station of BS broadcasting, and then the HDD unit 2 records the AV data. Described below is the operation that the AV data is recorded, and that at the same time, the AV data recorded in the HDD unit 2 is reproduced through the IEEE1394 bus 1 onto the monitor 5 connected to the STB 3.

The operation that the HDD unit 2 records the AV data is the same as that described above. That is, the IEEE1394 I/F 7 receives in the recording and reproducing port 21 an isochronous packet for recording, with identifying the channel number. The recording signal processing means 16 adds a time stamp for accumulation to the transport packet. The recording signal processing means 16 further analyzes the MPEG-2 transport stream, and thereby generates special reproduction information. Then, the recording signal processing means 16 transfers the MPEG-2 transport packet provided with a time stamp and the special reproduction information, to the transfer controlling means 18.

The transfer controlling means 18 stores the AV data and the special reproduction information transmitted from the recording signal processing means 16, temporarily into the buffer RAM 19. When a predetermined number of transport packets each provided with a time stamp are accumulated in the buffer RAM 19, the sum between the size of these transport packets and the size of header information containing the special reproduction information and the like reaches the size of the disk access unit of 2 Mbytes. In this timing, the transfer controlling means 18 transfers the data having the size of 2 Mbytes from the buffer RAM 19 to the interface 29 in the HDD 10. At this time, the transfer controlling means 18 specifies the record start LBA and the number of sectors for recording, and thereby issues a command which instructs the HDD 10 to record the data. Here, in case that the HDD 10 is presently in the course of data transfer, the recording command is issued after the completion of the data transfer.

On receiving the command via the interface 29 in the HDD 10, the controller 26 records the data into the magnetic disk 23.

The AV data recorded in the magnetic disk 23 as described above is reproduced simultaneously. In reproducing, the transfer controlling means 18 specifies the start LBA and the number of sectors (4096 sectors) of the AV data to be read out, and thereby issues a command which instructs the HDD 10 to read out the data. Here, in case that the HDD 10 is presently in the course of data transfer, the read command is issued after the completion of the data transfer.

On the basis of the start LBA and the number of sectors to be read out specified by the transfer controlling means 18, the controller 26 controls the spindle motor and the actuator 25, and thereby reads out the AV data through the magnetic head 24. The AV data read out is transferred to the interface 29.

The transfer controlling means 18 stores the AV data having the size of the disk access unit transferred from the interface 29, temporarily into the buffer RAM 19. The transfer controlling means 18 successively transfers the AV data to the reproduced signal processing means 17. In the timing that the AV data stored in the buffer RAM 19 is transferred to the reproduced signal processing means 17 by the size of the disk access unit, the transfer controlling means 18 issues the next read command to the HDD 10. In case that the HDD 10 is presently in the course of data transfer, the read command is issued after the completion of the data transfer.

The reproduced signal processing means 17 separates the time stamp added to the transport packet, and then transfers the transport packet to the IEEE1394 I/F 7 in the timing indicated by the time stamp.

The IEEE1394 I/F 7 transmits the MPEG-2 transport stream as an isochronous packet from the recording and reproducing port 21 to the IEEE1394 bus 1.

In such simultaneous recording and reproducing, the transfer controlling means 18 issues commands, with queuing the transmission of recording data and the transfer of reproduced data. Further, the transfer controlling means 18 arbitrates the data transfer between the recording signal processing means 16, the reproduced signal processing means 17, and the buffer RAM 19. Accordingly, the HDD unit 2 can simultaneously process the data of two channels or more.

Described below in detail is the operation that the stream controlling means 8 and the HDD 10 simultaneously record and reproduce AV data in the above-mentioned case.

In the prior art, dummy data has been added to a GOP of AV data, whereby fixed length data has been generated. Then, the data has been recorded to the HDD 10 on a GOP basis. In contrast, in the present embodiment, data is recorded to the HDD 10 by the unit of 194-byte data composed of a 188-byte transport packet 40 and a 6-byte time stamp 39 as shown in FIG. 6(*a*).

Figure 6A:
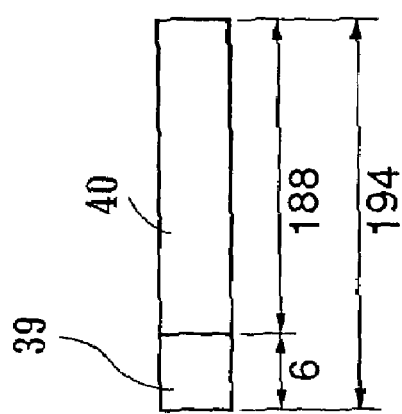
FIG. 6(*a*) illustrates that a record unit according to Embodiment 1 of the invention is composed of a transport packet and a time stamp.
Figure 6B:
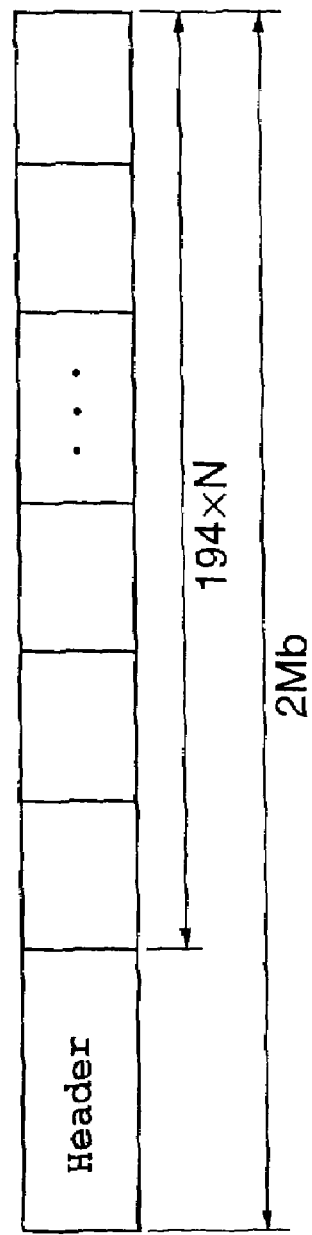

FIG. 6(*b*) shows (194×N+header size)-byte data composed of N pieces of 194-byte data (N indicates a positive integer) and a header. In the present embodiment, the header size is adjusted such that the total data size equals to the size of the disk access unit of 2 Mbytes. That is, in one time of the recording or reproducing of the AV data stored in the buffer RAM 19, data having the size of (194×N+header size)=2 Mbytes as shown in FIG. 6(*b*) is transferred to or from the HDD 10.

Figure 7:
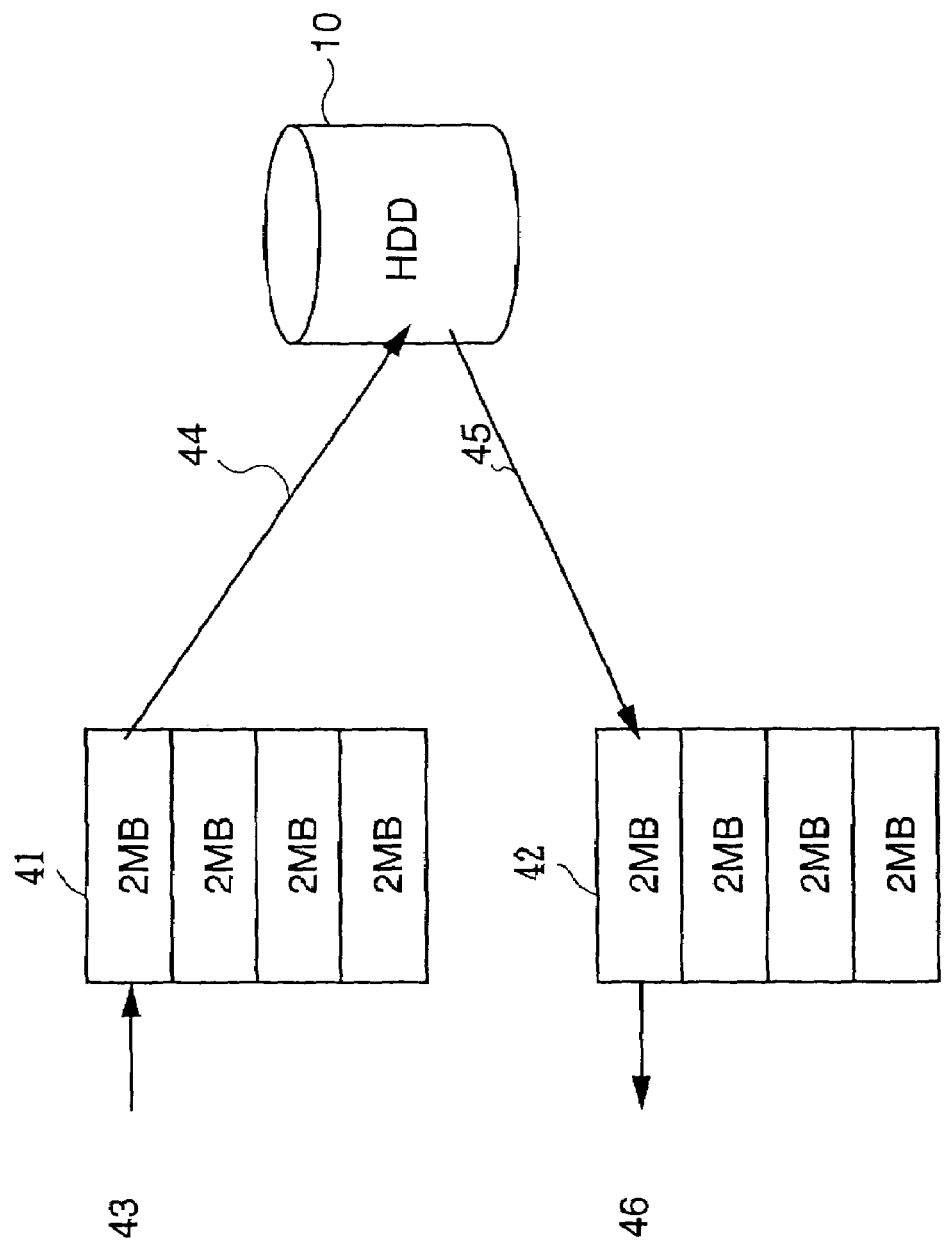
FIG. 7 shows a method of data transfer according to Embodiment 1 of the invention.

FIG. 7 shows a method of transferring the AV data. The buffer RAM 19 comprises a recording buffer 41 and a reproducing buffer 42.

Transport packets are successively input from the IEEE1394 I/F 7 to the recording signal processing means 16 in the stream controlling means 8, as indicated by input 43. In the input 43, data of 2 Mbytes or the like is input in 0.5 second.

The recording signal processing means 16 adds a time stamp for accumulation to the transport packet, and thereby generates 194-byte data. The recording signal processing means 16 further generates special reproduction information, and then transfers the 194-byte data and the special reproduction information to the transfer controlling means 18. The transfer controlling means 18 stores the data transferred from the recording signal processing means 16, temporarily into the recording buffer 41. The transfer controlling means 18 further generates header information for the disk access unit containing the special reproduction information, and then stores the header information into the recording buffer 41. The header information of the disk access unit is described later.

In the timing that the data having the size of the disk access unit is accumulated in the recording buffer 41, the transfer controlling means 18 transfers to the HDD 10 the data having the size of the disk access unit stored in the recording buffer 41, and at the same time, issues a recording command. In case that the HDD 10 is presently in the course of data transfer, the transfer controlling means 18 carries out queuing when receiving the new data transfer request. A command is issued to the HDD 10 immediately so that after the completion of the present data transfer in the HDD 10 the queued transfer request is processed. FIG. 7 illustrates the case that the size of the disk access unit is 2 Mbytes.

On receiving the recording data and the recording command, the interface 29 stores the data temporarily into the buffer cache 30, and then transfers the data successively from the buffer cache 30 to the controller 26. As such, in response to the recording command from the transfer controlling means 18, the controller 26 records the data having the size of the disk access unit into the magnetic disk 23, as indicated by write 44. The time necessary in the write 44 is approximately 150-250 ms.

The reproducing buffer 42 successively transfers data to the reproduced signal processing means 17. Then, as indicated by output 46, the reproduced signal processing means 17 outputs a transport packet to the IEEE1394 I/F 7 in the timing indicated by the time stamp added to the transport packet. In the output 46, data of 2 Mbytes or the like is output in 0.5 second.

In the timing that the data in the reproducing buffer 42 is output by the size of the disk access unit, the transfer controlling means 18 issues a read command to the HDD 10. In case that the HDD 10 is presently in the course of data transfer, the transfer controlling means 18 queues the new data transfer request. A read command is issued to the HDD 10 immediately after the completion of the present data transfer in the HDD 10, whereby the queued transfer request is processed.

On receiving the read command, the interface 29 reads out the data by the size of the disk access unit from the magnetic disk 23, and then stores the data temporarily into the buffer cache 30. Then, the data is successively transferred from the buffer cache 30 to the interface 29. As such, in response to the read command from the transfer controlling means 18, the controller 26 transfers the data from the magnetic disk 23 to the interface 29 as indicated by read-out 45. The transfer controlling means 18 stores the data read out as described above, temporarily into the reproducing buffer 42.

Figure 8:
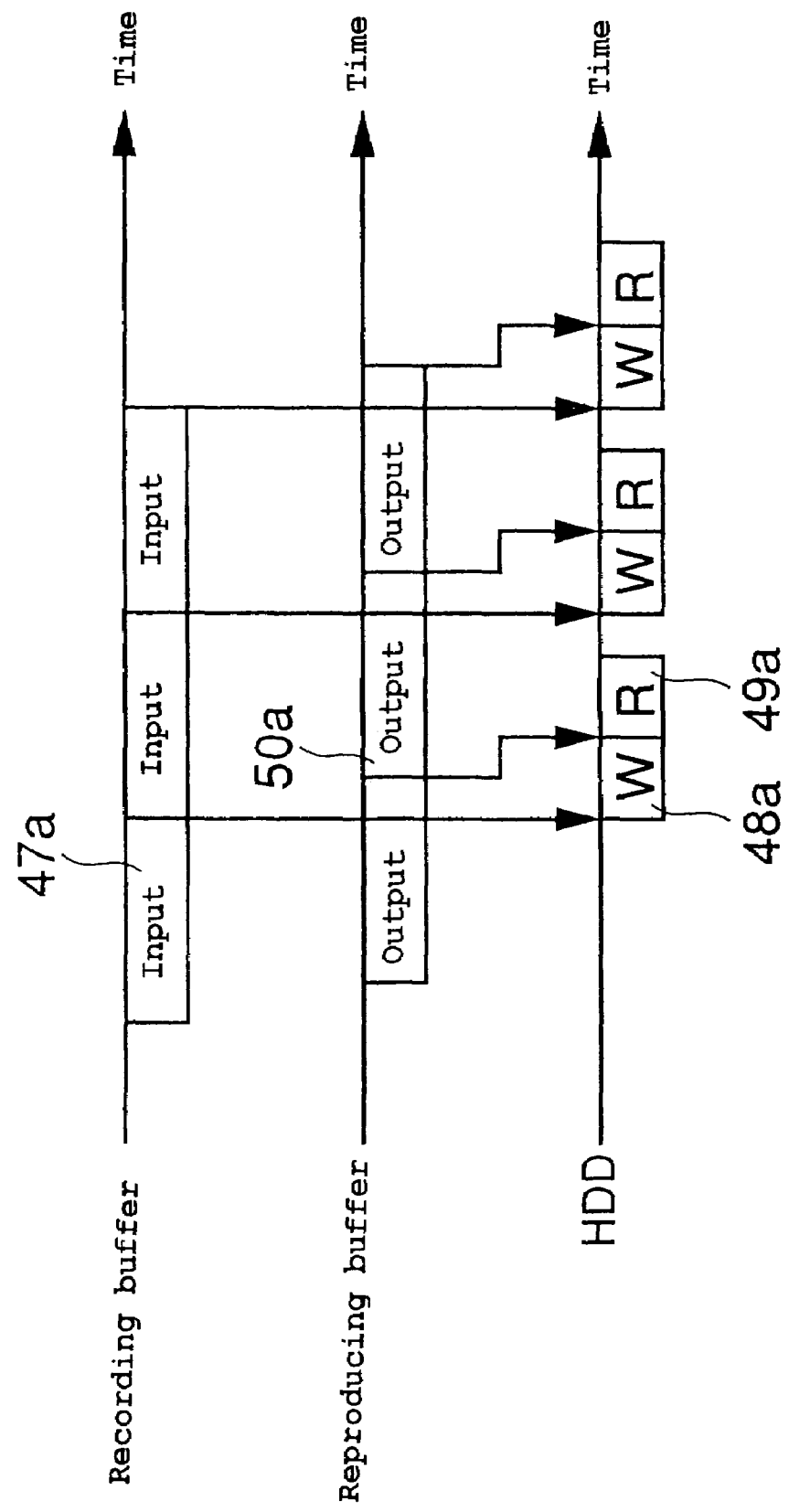
FIG. 8 is a time chart showing the situation in which recording and reproducing of AV data are carried out simultaneously according to Embodiment 1 of the invention.

The above-mentioned recording and reproducing of AV data are carried out, with the transfer controlling means 18 queuing the transfer requests to the HDD 10. FIG. 8 is a time chart showing this situation.

Transport packets each provided with a time stamp are successively input to the recording buffer 41 as indicated by input 47*a*. In the timing that the data including the header is accumulated to the size of the disk access unit, the data having the size of the disk access unit is written into the HDD 10 as indicated by W (write) 48*a*.

On the other hand, transport packets each provided with a time stamp are successively output from the reproducing buffer 42 as indicated by output 50*a*. In the timing that the data is output by the size of the disk access unit, data having the size of the disk access unit is read out from the HDD 10, and then stored into the reproducing buffer 42 as indicated by R (read) 49*a*. Each Arrow in the figure indicates a trigger for data transfer.

As such, the transfer controlling means 18 queues the recording or reproducing requests to the HDD 10 in the order of occurrence, and thereby issues recording or reproducing commands to the HDD 10.

The recording and reproducing commands from the transfer controlling means 18 are received by the interface 29. The interface 29 transfers the data via the buffer cache 30. In the execution of a recording command, the controller 26 records the data stored in the buffer cache 30, into the magnetic disk 23. In contrast, in the execution of a reproducing command, the controller 26 moves the data from the magnetic disk 23 into the buffer cache 30.

The processes of W 48*a* and R 49*a* are completed in a time shorter than that of the input 47*a* and the output 50*a*.

Figure 9:
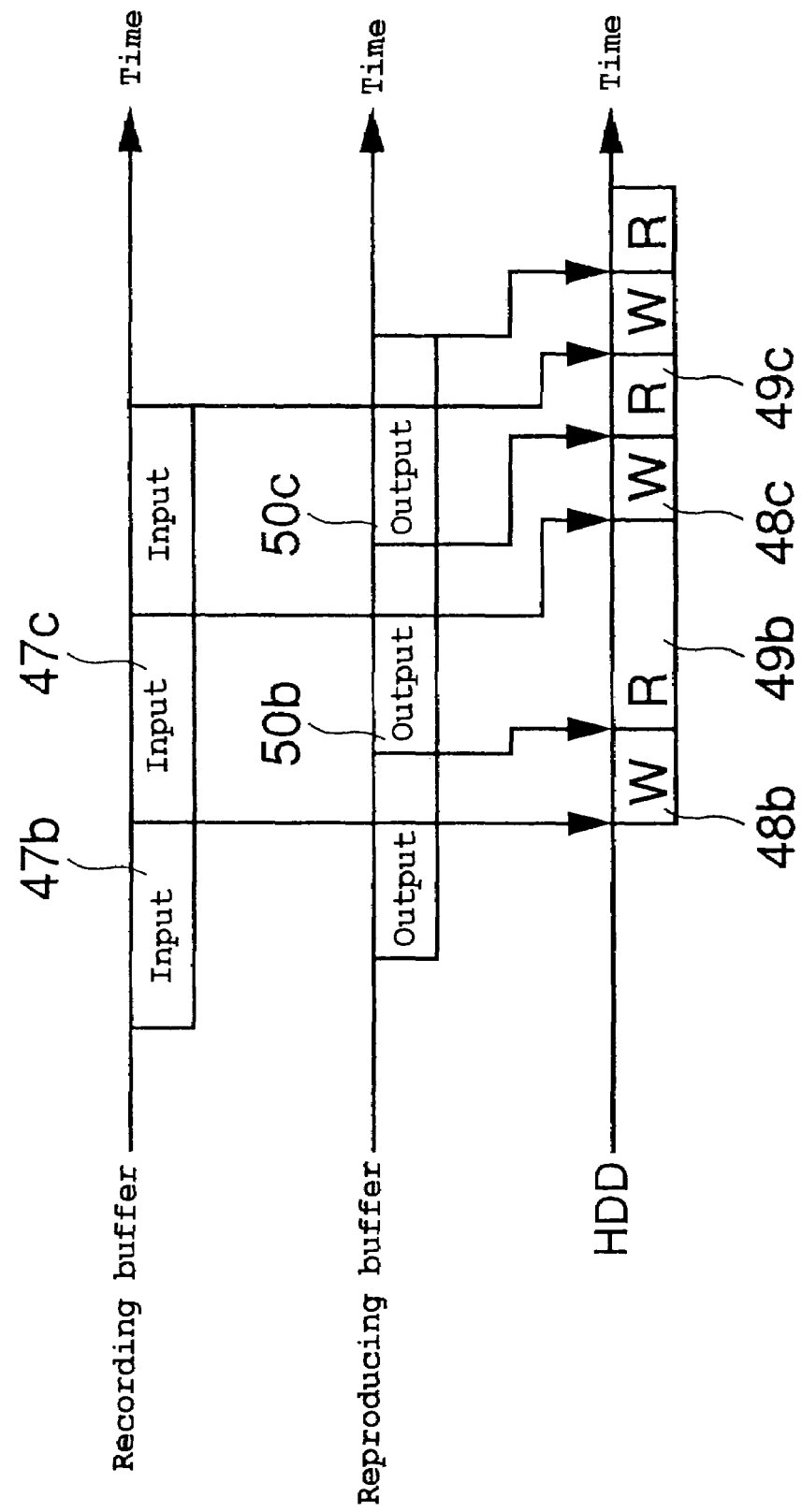
FIG. 9 is a time chart showing the situation in which recording and reproducing of AV data are carried out simultaneously according to Embodiment 1 of the invention.

At that time, it is assumed that the reading of data having the size of the disk access unit from the HDD 10 is delayed in comparison with normal cases because of the occurrence of retry and the like. FIG. 9 is a time chart showing such a case that the reading of data from the HDD 10 is delayed. In FIG. 9, it is assumed that the process of R 49*b* is delayed in comparison with normal cases.

Then, in the timing that data having the size of the disk access unit is accumulated in the recording buffer 41 as indicated by input 47*c*, the data having the size of the disk access unit is written into the HDD 10 as indicated by W 48*c*. After that, data is read out from the HDD 10 as indicated by R 49*c*.

As described above, the processes of W 48*b* and R 49*c* are completed in a time shorter than that of the input 47*b* and the output 50*b*. In contrast to the prior art in which such a delay has caused a drop in the AV data, the delay occurred in R 49*b* can be recovered according to the present embodiment, as seen from FIG. 9.

As described above, in the timing that data having the size of the fixed-length disk access unit is stored in or output from the buffer RAM 19, data is recorded into or reproduced from the HDD 10. By virtue of this, even when the recording or reproducing to or from the HDD 10 is delayed, no drop occurs in the AV data. Further, the delay can be recovered.

According to the HDD unit 2 of the present embodiment, when a program is reproduced and viewed on the monitor 5, the reproduction can be temporarily stopped during the simultaneous recording and reproducing for the purpose of the user's convenience. The display on the monitor 5 is stationary, and the viewing is stopped temporarily.

After the temporary stop, the viewing can be continued on the monitor 5. Further, the user can trace the program to the presently broadcasted scene, with checking the essence of the program by special reproduction such as fast reproduction. Such tracing the program to the presently broadcasted scene by special reproduction is referred to as trace reproduction.

The operation in the trace reproduction is described below.

The operation of recording the presently broadcasted program is the same as that described above, and hence the description is omitted.

By issuing a read command to the HDD 10, the transfer controlling means 18 reads out data for special reproduction used in the trace reproduction, and then stores the data temporarily into the buffer RAM 19.

The transfer controlling means 18 reads the special reproduction information generated for this purpose in the recording, and thereby recognizes the portion of the recorded AV data to be read out.

When a few frames of the data for trace reproduction is accumulated in the buffer RAM 19, the transfer controlling means 18 transfers the data for trace reproduction to the reproduced signal processing means 17.

The AV data is transferred as transport packets from the transfer controlling means 18 to the reproduced signal processing means 17. At that time, only a part of the transport packets of the recorded AV data are transferred. That is, transport packets containing all or part (for example, the I-frame only) of each frame used in the special reproduction are transferred. Accordingly, in some cases, information necessary in the MPEG grammar can be lost. Alternatively, unnecessary information can be added.

Thus, the reproduced signal processing means 17 rearranges the received transport packets so as to match with the MPEG grammar, and then transfers the rearranged transport packets as an MPEG-2 transport stream to the IEEE1394 I/F 7.

The following operation is the same as the above-mentioned reproducing operation, and hence the description is omitted.

As such, in case of trace reproduction, the reproduced signal processing means 17 rearranges an MPEG-2 transport stream for special reproduction.

As described above, in the HDD unit 2 according to the present embodiment, the size of the disk access unit has been determined so that continuous transfer of the AV data is ensured even in multi-channel processing. In addition, adopted is a recording format suitable for the recording and reproducing of AV data.

Accordingly, in the reproducing of AV data, avoided is the problem that the data transfer by the HDD unit 2 is delayed due to the processes in which the AV decoder 13 expands the compression of the AV data, converts the data into an analogue signal, and thereby displays the data onto the monitor 5. Further, in the recording of AV data, avoided is the problem that the HDD unit 2 can not completely record the AV data received by the tuner 11 and transferred from the IEEE1394 I/F 14, and that an overflow is caused in the buffer RAM 19.

The AV data recorded in the magnetic disk 23 is deleted when unnecessary. The deletion is carried out on the disk access unit basis.

Accordingly, each blank region on the magnetic disk 23 necessarily has the size of the disk access unit or larger even after repeated recording and deletion of AV data in the magnetic disk 23. This avoids the occurrence of a region smaller than the size of the disk access unit. This ensures continuous transfer of the AV data in recording and reproducing.

Further, the size of the disk access unit has been determined so that continuous transfer of the AV data is ensured even in case of AV data for Hi-visions (high definition televisions) having a high transfer rate. Thus, simultaneous recording and reproducing can be carried out even in such a case.

The recording format adopted in the HDD 10 according to the present embodiment is described below.

Figure 10:
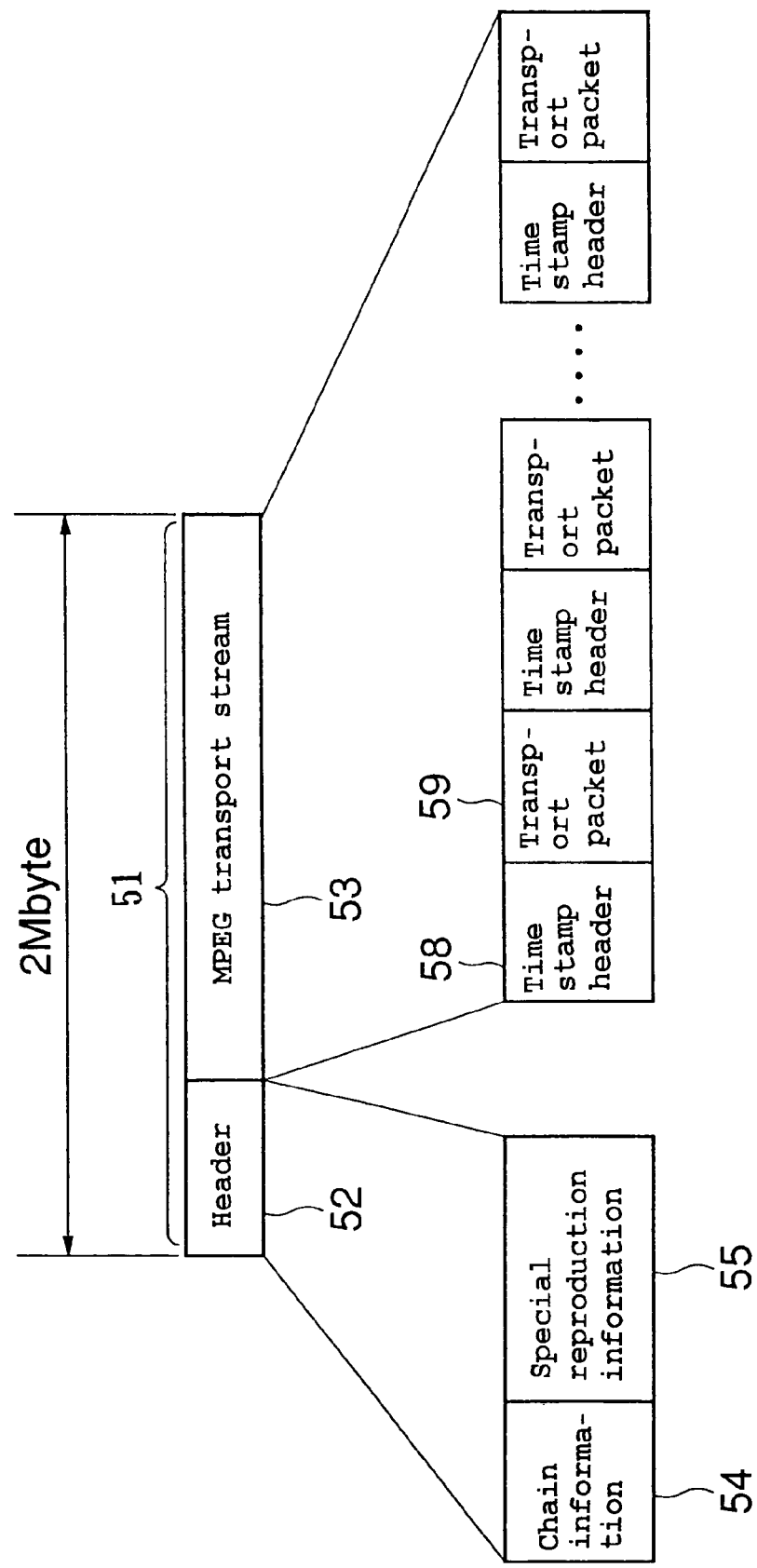
FIG. 10 shows the record format of a disk access unit according to Embodiment 1 of the invention.
Figure 13:
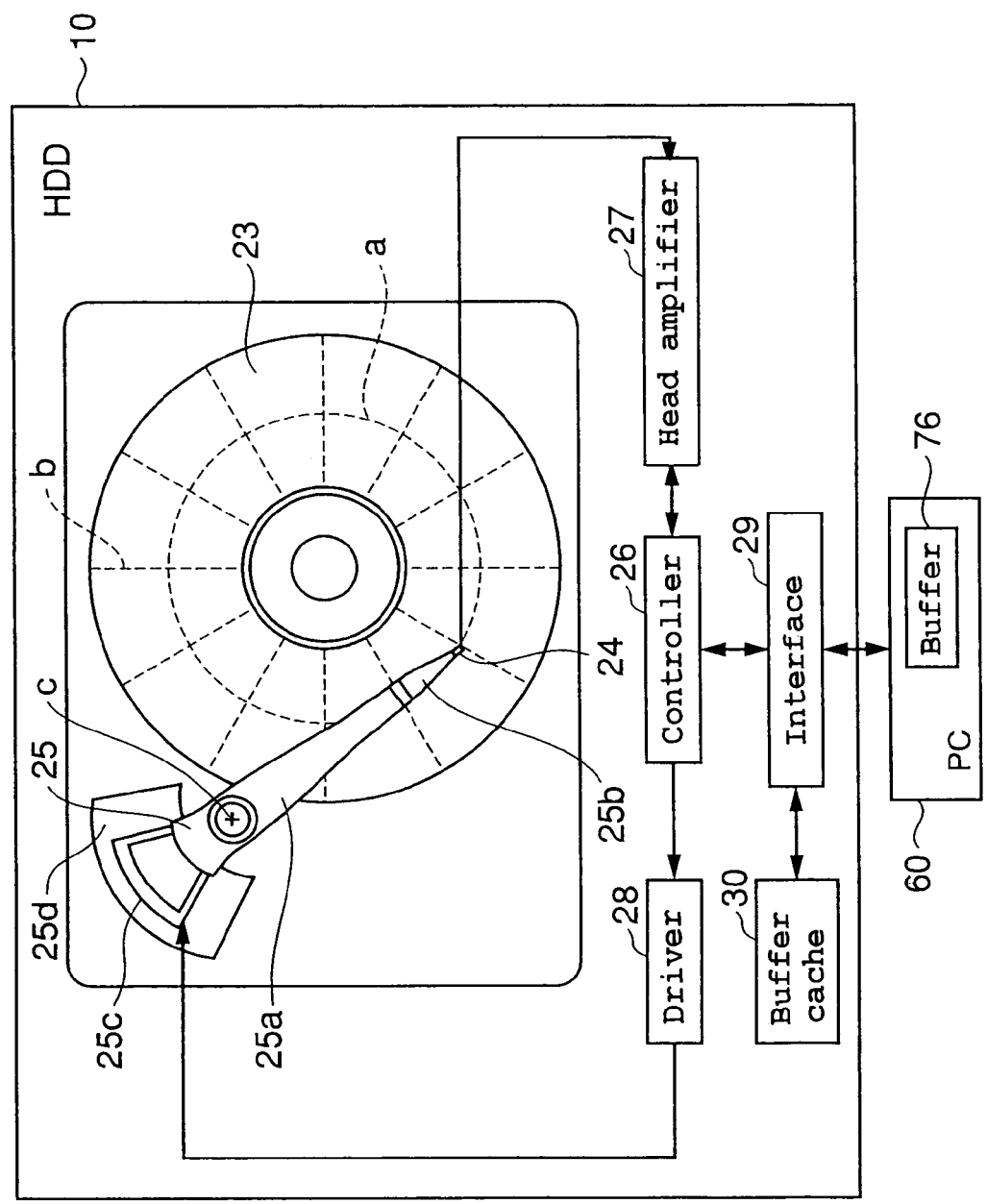
FIG. 13 shows the configuration of a prior art HDD unit.
Figure 14:
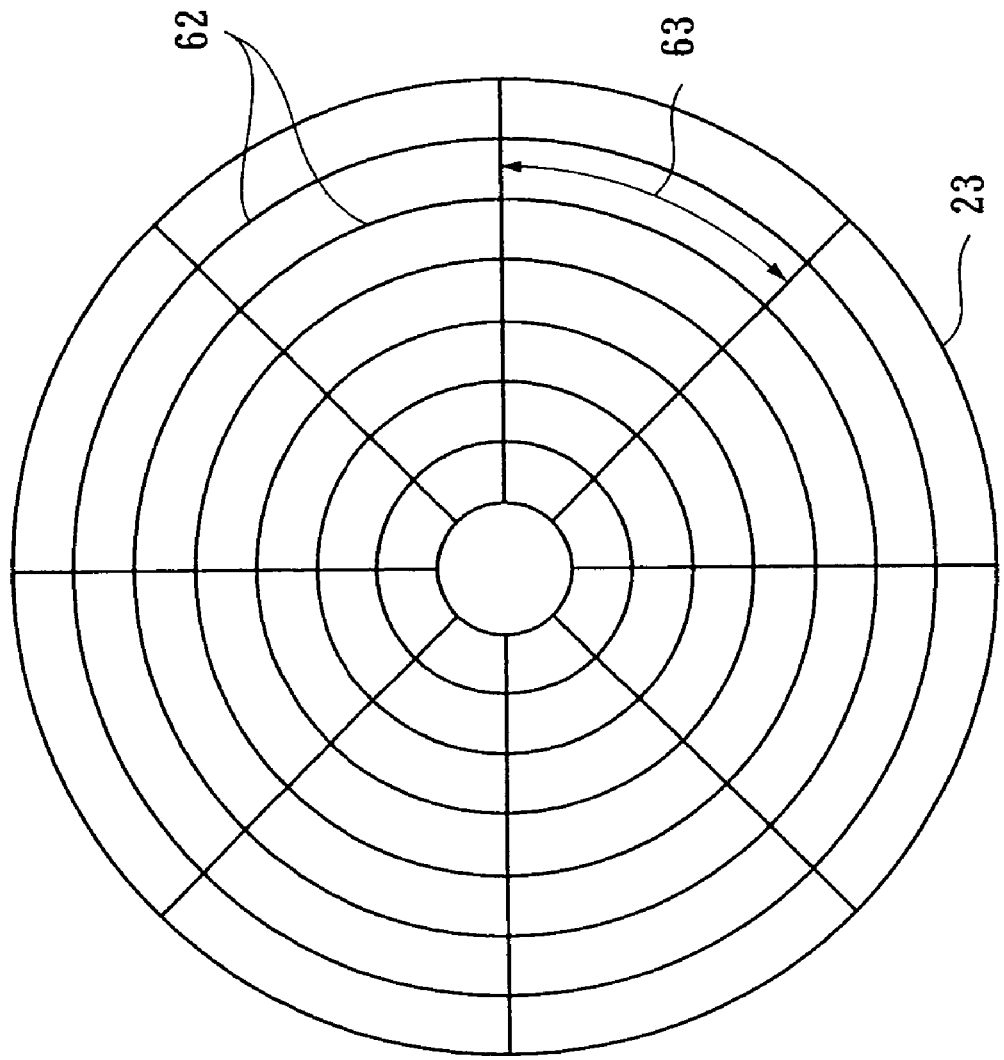
FIG. 14 shows the configuration of a prior art magnetic disk.
Figure 15B:
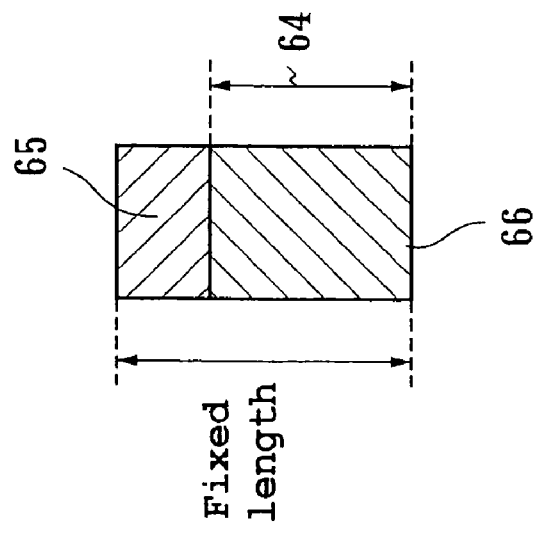
FIG. 15(*a*) shows the configuration of a GOP.
Figure 15A:
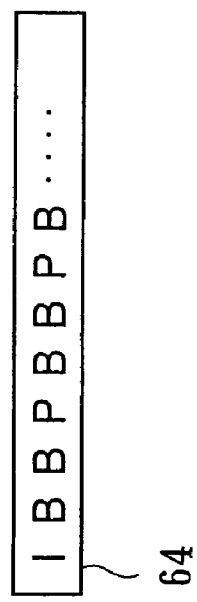
Figure 15C:
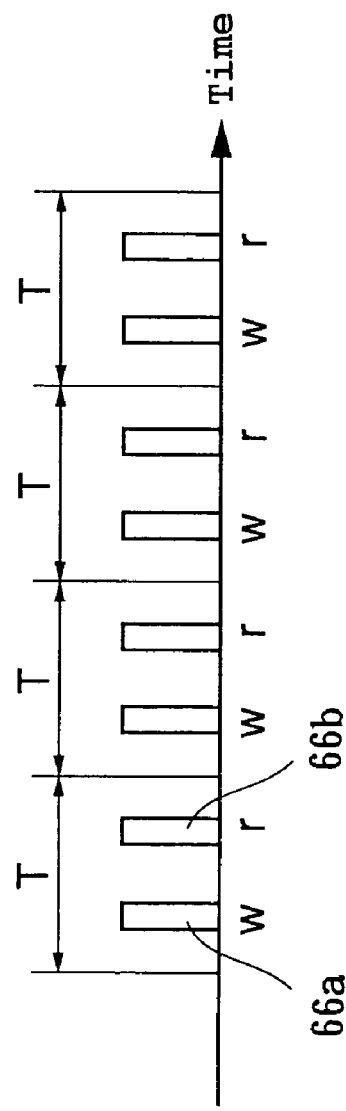
Figure 16:
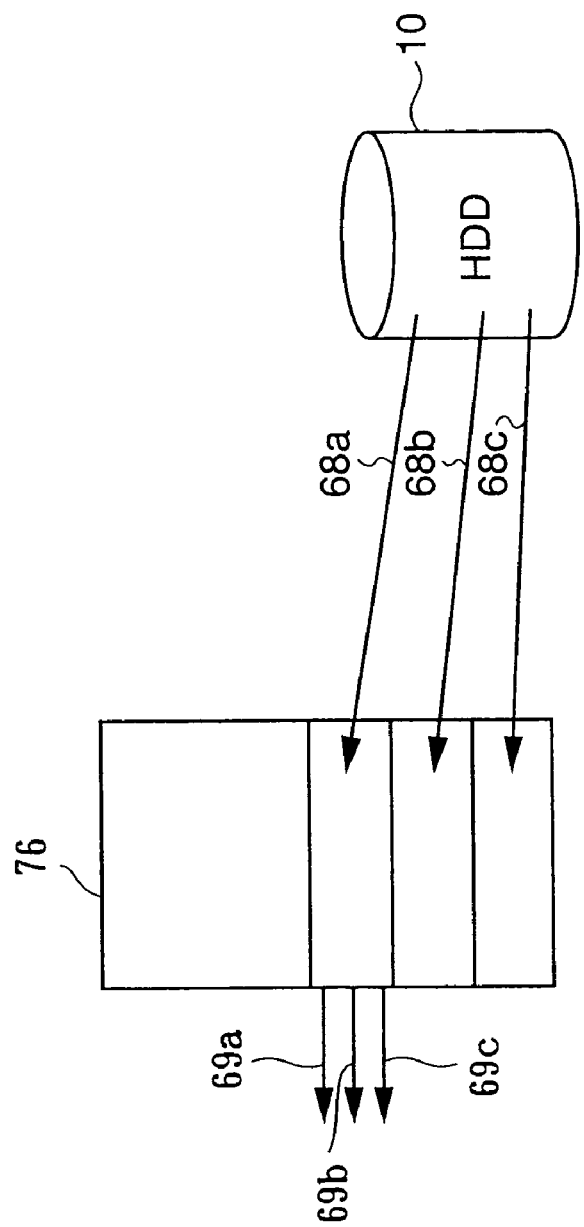
FIG. 16 shows the reproducing operation of a prior art HDD unit.
Figure 17A:
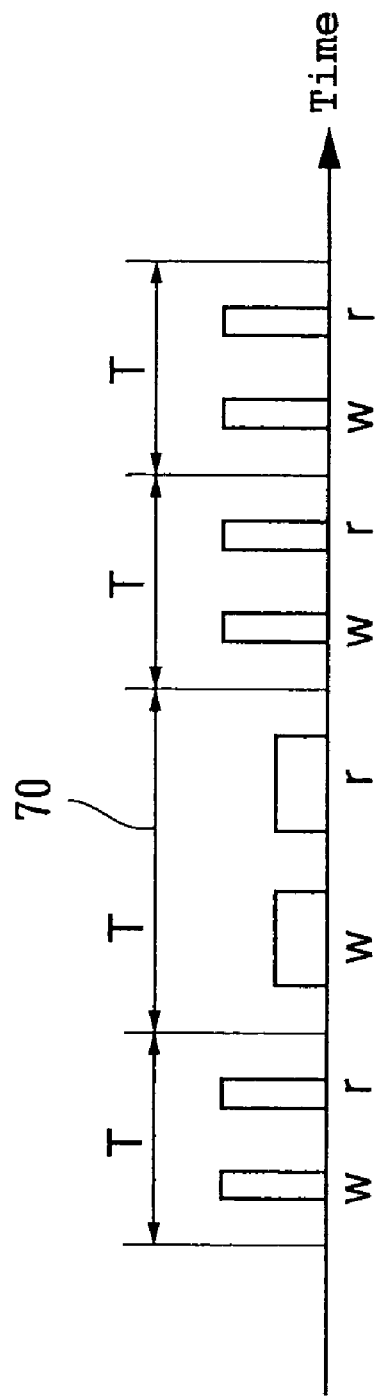
FIG. 17(*a*) is a time chart of a prior art HDD unit in the case when a delay has occurred in recording or reproducing in the magnetic disk.
Figure 17B:
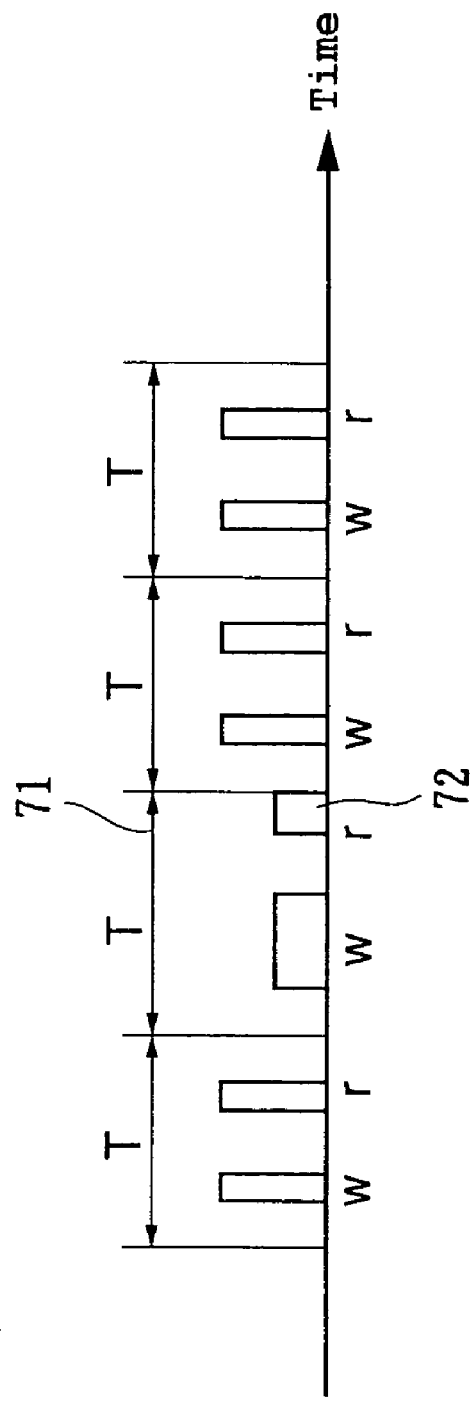
Figure 18:
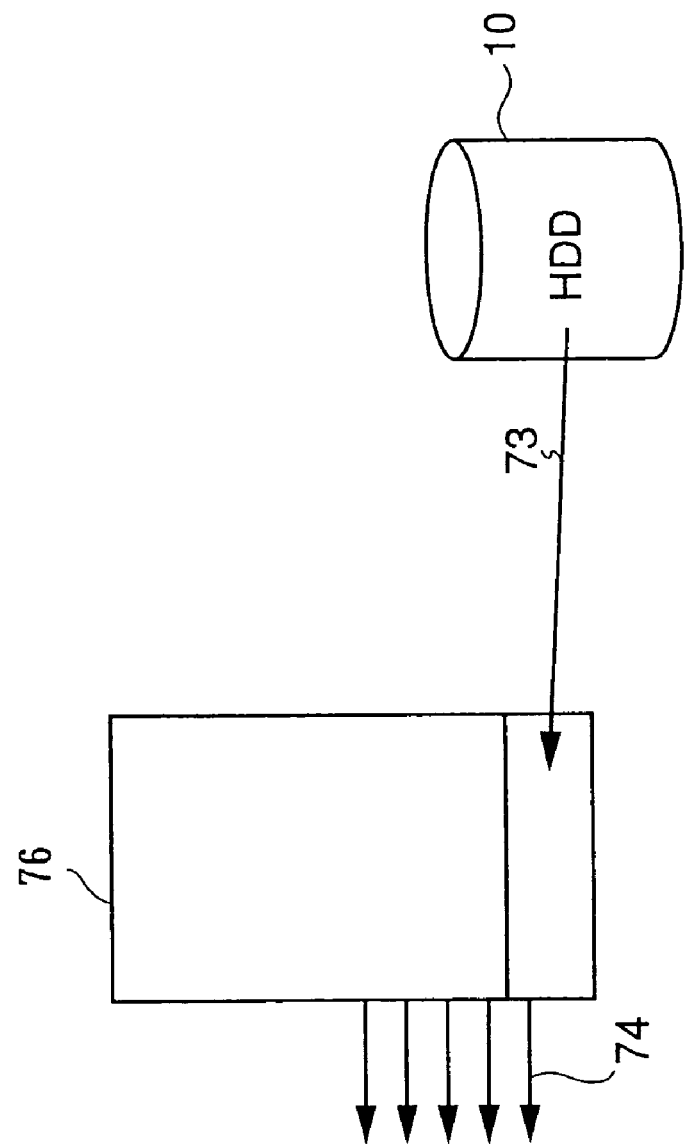
FIG. 18 shows the reproducing operation of a prior art HDD unit when a delay has occurred in recording or reproducing in the magnetic disk.

FIG. 10 shows the recording format according to the present embodiment.

The disk access unit 51 has a fixed length determined as described above. A typical size of the disk access unit is 2 Mbytes. The disk access unit 51 is divided into a header 52 and an MPEG-2 transport stream 53.

The header 52 contains chain information 54 and special reproduction information 55.

The chain information 54 contains the disk access unit number serving as the address referring the next disk access unit 51. The special reproduction information 55 contains: location information used for accessing a frame of the AV data; information specifying the type (I-, P-, or B-frame) of the frame; and the frame number.

The MPEG-2 transport stream 53 contains transport packets 59 each provided with a time stamp as indicated by a time stamp header 58.

Since the disk access unit 51 has a fixed length, the header 58 of each transport packet can be obtained by calculation. This speeds up the access.

Further, since the header 52 of the disk access unit 51 contains the special reproduction information 55, special reproduction is carried out efficiently even in simultaneous recording and reproducing.

The present embodiment has been described for the case that the stream controlling means 8 processes the transfer to the HDD 10 in the order of occurrence of transfer requests. However, the present invention is not restricted to this. The stream controlling means 8 may process the transfer to the HDD 10 in the order of priority of the transfer requests. For example, recording requests may be provided with a higher priority than that of reproducing requests, whereby recording may be processed with priority.

Further, the present embodiment has been described for the case that the HDD unit 2 comprises stream controlling means 8. However, the present invention is not restricted to this. The HDD unit 2 may comprise no stream controlling means 8 but an HDD 10. Then, the function of the stream controlling means 8 may be carried out by a personal computer.

Embodiment 2

Embodiment 2 is described below.

The present embodiment is described for the case that an error occurred in recording or reproducing is processed in defective region management in the HDD unit.

The HDD unit according to the present embodiment is the same as that according to Embodiment 1.

Figure 19C:
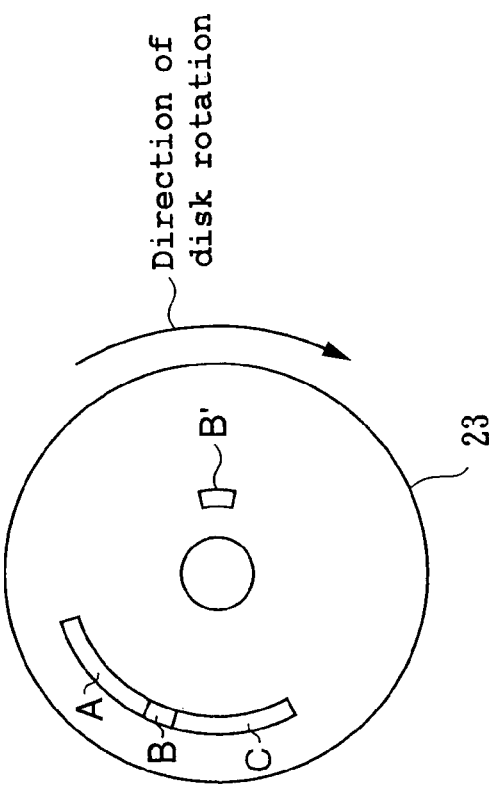
FIG. 19(*a*) shows the correspondence between LBAs and magnetic disk regions in a prior art HDD unit before an alternation process.
Figure 19A:
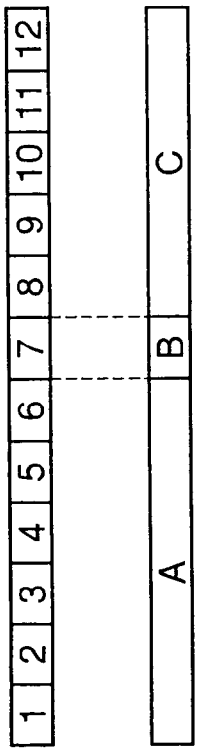
Figure 19B:
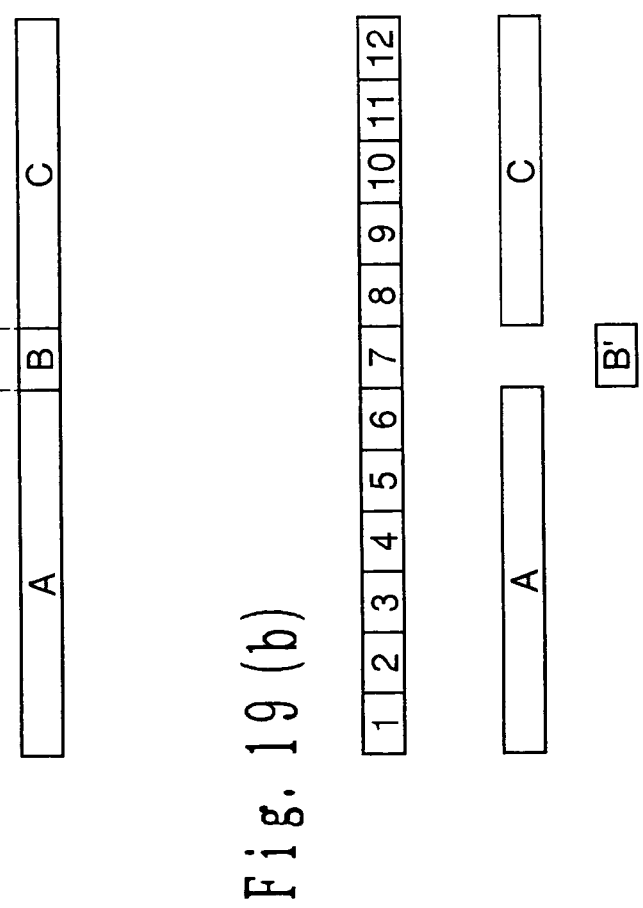
Figure 20:
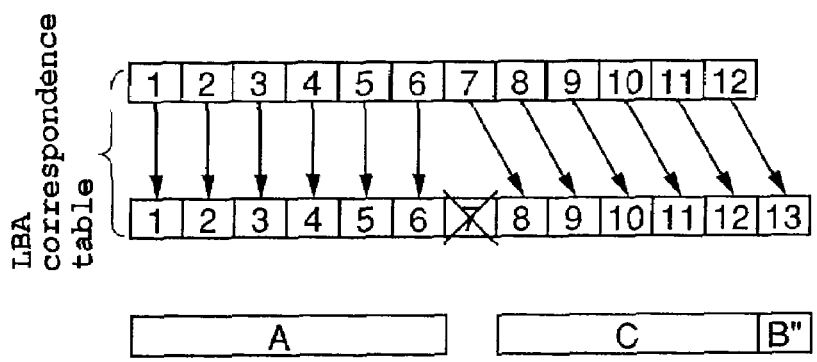
FIG. 20(*a*) illustrates an LBA reassignment process in a prior art HDD unit.
Figure 20:
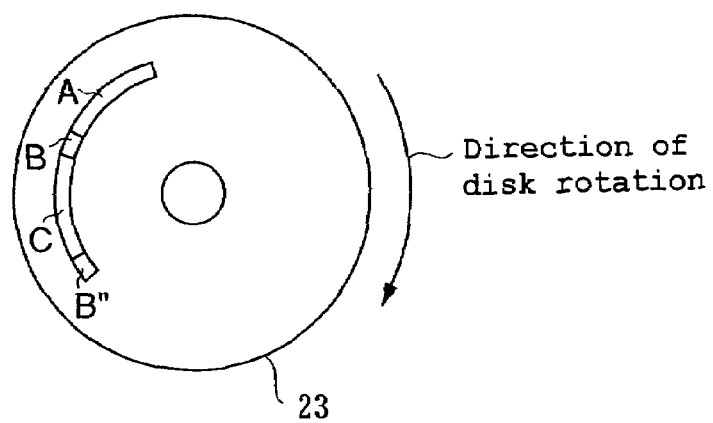

The HDD 10 retains a table shown in FIG. 11. The table corresponds LBAs to physical addresses. Similarly to the prior art case shown in FIG. 19, when a defective sector is found, the HDD 10 carries out an alternate process on a sector basis. The alternate process is carried out by replacing a physical address in the table shown in FIG. 11 by the physical address of a sector in the alternate region.

The buffer RAM 19 contains a DAU management table 80 shown in FIG. 12(*a*) and a DAU conversion table 84 shown in FIG. 12(*b*).

The DAU management table 80 is used for managing the regions of the magnetic disk 23 on the disk access unit basis. Each row in this table comprises a DAU number 81, a DAU number 82 after alternate process, and an error counter 83.

The magnetic disk 23 is divided into disk access units. Then, the DAU number 81 identifies a disk access unit on the magnetic disk 23.

The error counter 83 counts the number of failure in the recording and reproducing of the data to and from the disk access unit within a predetermined time interval.

The DAU number 82 after alternate process is the DAU number of a disk access unit used in place of the disk access unit in which the number of failure indicated in the error counter 83 exceeds a predetermined value.

The DAU conversion table 84 is used for obtaining the start LBA of a disk access unit from the disk access unit number.

A DAU number 85 is a disk access unit number.

A start LBA 86 is the start LBA of a disk access unit.

Disk access units are classified in advance into disk access units used for normal recording and reproducing and disk access units used for alternate processes. For example, disk access units having DAU numbers 1-10000 are used for normal recording and reproducing, while disk access units having DAU numbers 10001-10500 are used for alternate processes.

Described below is the operation of a system having the above-mentioned configuration according to the present embodiment.

Similarly to Embodiment 1, the transfer controlling means 18 specifies an LBA and the number of sectors, and thereby instructs the HDD 10 to record or reproduce AV data.

More specifically, the transfer controlling means 18 determines the DAU number of a disk access unit for the next recording (or reproducing), and then converts the DAU number 81 into the DAU number 82 after alternate process by referring to the DAU management table 80.

For example, in FIG. 12(*a*), when the DAU number of a disk access unit for the next recording (or reproducing) is 4, the transfer controlling means 18 reads the DAU number 82 after alternate process in the row having the DAU number 81 of 4. This number is the desired DAU number after alternate process. In FIG. 12(*a*), the DAU number after alternate process is 4 which is the same as the DAU number before alternate process.

The transfer controlling means 18 further refers to the DAU conversion table 84, and thereby obtains the start LBA corresponding to the DAU number 82 after alternate process. In FIG. 12(*b*), the start LBA 86 corresponding to the DAU number 85 of 4 is 12289.

The start LBA and the number of sectors of the disk access unit obtained as described above are notified to the HDD 10. The number of sectors is 4096, herein.

The HDD 10 converts the LBA into a physical address, using the table shown in FIG. 11 for corresponding an LBA to the combination of a track number and a sector number. That is, when receiving the LBA and the number of sectors from the transfer controlling means 18, the controller 26 in the HDD 10 identifies a sector on a track on the magnetic disk 23 according to the table shown in FIG. 11, and thereby record or reproduce AV data.

In the recording of data, in case that the data can not normally be written into a sector, the controller 26 carries out retry processes. Similarly, in the reproducing of data, in case that the data can not normally be read out from a sector, the controller 26 carries out retry processes. When the number of retry processes exceeds a predetermined value such as ten, an alternation process is carried out on a sector basis similarly to the prior art management of defective regions shown in FIG. 19. The alternate process is carried out by replacing a physical address in the table shown in FIG. 11 by the physical address of a sector in the alternate region. As such, the alternation process in the HDD 10 is the same as the prior art.

On the other hand, the transfer controlling means 18 measures the process time for the disk access unit under present recording (or reproducing). When the recording (or reproducing) process time exceeds a predetermined value, the error counter 83 shown in FIG. 12 is incremented by unity.

For example, when the recording (or reproducing) process time for the disk access unit corresponding to the DAU number 81 of 4 exceeds the predetermined value, the error counter 83 corresponding to the DAU number 81 of 4 is incremented by unity from 5 into 6.

When the count number in the error counter 83 exceeds a predetermined value such as ten, the transfer controlling means 18 carries out an alternation process on a sector basis, whereby the disk access unit is replaced by another disk access unit.

For example, in FIG. 12, the error counter 83 for the disk access unit corresponding to the DAU number 81 of 4 has a present value of 5. However, when the number becomes 11, the DAU number 82 after alternate process corresponding to the DAU number 81 of 4 is rewritten from 4 into 10001. As such, the alternation process is carried out by changing the DAU number 82 after alternate process into the DAU number of a disk access unit used after the alternation process. Further, in case that before the alternation process on a sector basis, any data is already stored in the disk access unit corresponding to the DAU number of 4, the data is copied into the disk access unit corresponding to the DAU number of 10001. Then, the error counter 83 corresponding to the DAU number 81 of 4 is reset to zero.

The DAU management table 80 is updated as such. Accordingly, when the disk access unit corresponding to the DAU number 81 of 4 is accessed for recording or reproducing, the disk access unit corresponding to the DAU number of 10001 is actually accessed. Thus, the defective disk access unit is not used hereafter by virtue of the alternation process on a disk access unit basis.

As such, the transfer controlling means 18 carries out an alternation process on a disk access unit basis. In the prior art case of an alternation process on a sector basis, a disk access unit is composed of non-consecutive sectors after the alternation process. In the recording and reproducing of the data in such a disk access unit, seek actions are unavoidable during one transfer operation to or from the disk access unit. That is, the alternation process according to the prior art reduces the transfer rate of the data. This can impair continuous transfer of the AV data.

In contrast, the transfer controlling means 18 according to the present embodiment carries out an alternation process on a disk access unit basis. This resolves the above-mentioned problem.

In addition to the alternation processes on a disk access unit basis carried out by the transfer controlling means 18, the HDD 10 carries out alternation processes on a sector basis similar to the prior art. Accordingly, a disk access unit can be composed of non-consecutive sectors after the HDD 10 carries out an alternation process. This causes the necessity of seek actions during the recording and reproducing of the data to and from the disk access unit.

However, the transfer controlling means 18 measures the process time for the disk access unit under recording or reproducing. At that time, the process time for the disk access unit under recording or reproducing is assumed to be shorter than a predetermined value when, for example, up to four sectors in the disk access unit have undergone the alternation process by the HDD 10. Nevertheless, when five sectors in the disk access unit have undergone the alternation process on a sector basis by the HDD 10, the process time for the disk access unit under recording or reproducing is assumed to exceed the predetermined value.

In this case, at the time when four sectors in the disk access unit have undergone the alternation process, the transfer controlling means 18 does not increment the error counter 83. In contrast, at the time when five sectors in the disk access unit have undergone the alternation process, the transfer controlling means 18 increments the error counter 83 for the disk access unit during the recording or reproducing. When the value in the error counter 83 exceeds ten, the transfer controlling means 18 carries out an alternation process on a disk access unit basis. That is, a disk access unit does not need to be composed of consecutive sectors completely, but may contain non-consecutive sectors in a certain number such as four.

Accordingly, a disk access unit containing defective sectors not exceeding a predetermined number such as three can be used as a disk access unit for alternation process.

Further, the alternation process on a disk access unit basis according to the present embodiment does not cause extra seek actions. This avoids the necessity of the time-consuming LBA reassignment process in the prior art.

Accordingly, continuous transfer of the AV data is ensured even after the alternation process.

The present embodiment has been described for the case that the buffer RAM 19 contains the DAU management table 80 and the DAU conversion table 84, and that the transfer controlling means 18 carries out an alternation process on a disk access unit basis. However, the invention is not restricted to this. The HDD 10 may comprise a memory, whereby the memory may contain the DAU management table 80 and the DAU conversion table 84. Further, the HDD 10 may carry out an alternation process on a disk access unit basis. The DAU management table 80 and the DAU conversion table 84 contained in the buffer RAM 19 are recorded into the magnetic disk 23 in the HDD 10 at a predetermined timing. By virtue of this, when the power is switched off and then switched on later, the DAU management table 80 and the DAU conversion table 84 are read out from the magnetic disk 23 into the buffer RAM 19. Thus, the DAU management table 80 and the DAU conversion table 84 are conserved even after power-off.

The present embodiment has been described for the case that the disk access units are managed using the DAU management table 80 and the DAU conversion table 84. However, the invention is not restricted to this. Without the DAU conversion table 84, the start LBA of a disk access unit may be calculated according to a rule providing the correspondence between disk access units and LBAs. An example of the rule is that the LBAs in descending order are sequentially assigned to the disk access units in descending order of the DAU number. In this case, the start LBA of a disk access unit is easily calculated because the size of the disk access unit is fixed. Further, it is possible not to use any of the DAU management table 80 and the DAU conversion table 84. In this case, using the table shown in FIG. 11 for corresponding LBAs to physical addresses, the physical addresses of all the sectors in a disk access unit are changed into those of consecutive alternate sectors as a whole. This permits an alternation process on a disk access unit basis.

The present embodiment has been described for the case that a disk access unit containing defective sectors not exceeding a predetermined number can be used as a disk access unit for alternation process. However, the invention is not restricted to this. a disk access unit containing no defective sector may solely be used as a disk access unit for alternation process.

The present embodiment has been described for the case that when the count number in the error counter for a disk access unit exceeds ten, an alternation process on a disk access unit basis is applied to the disk access unit. However, the invention is not restricted to this. The alternation process on a disk access unit basis may be applied to the disk access unit, when the count number in the error counter exceeds a predetermined value such as 5, 15, and 20.

The present invention also provides a program for causing a computer to carry out the operations in all or part of the steps (or processes, operations, effects, etc.) of the access method of the invention described above, wherein the program operates in collaboration with the computer.

The present invention also provides a medium holding thereon a program for causing a computer to carry out all or part of the operations in all or part of the steps of the recording/reproducing method of the invention described above, wherein the medium is readable by the computer and the thus read program carries out the above operations in collaboration with the computer.

Here, part of the steps (or processes, operations, effects, etc.) of the invention means some of the plurality of steps, or some of the operations in one step.

A computer readable recording medium with the program of the invention recorded thereon also falls within the scope of the present invention.

In one utilization mode of the program of the invention, the program may be recorded on a recording medium readable by a computer, and operated in collaboration with the computer.

In another utilization mode of the program of the invention, the program may be transmitted through a transmission medium, read by a computer, and operated in collaboration with the computer.

The data structure of the invention includes data base, data format, data table, data list, data type, or the like.

The recording medium includes a ROM or the like, and the transmission medium includes a transmission medium such as the Internet, or a transmission medium such as light, electric waves, sound waves, etc.

The computer of the invention described above is not limited to pure hardware such as a CPU, but may include firmware, an OS, or even a peripheral device.

As described above, the configuration of the invention may be implemented in software or in hardware.

INDUSTRIAL APPLICABILITY

As seen from the above-mentioned description, the invention provides a hard disk apparatus, a recording/reproducing method, a medium and a program, capable of avoiding an idle time in data transfer.

Further, the invention provides a hard disk apparatus, an access method, a medium, and a program in which even when the recording or reproducing of AV data is delayed, the delay is recovered, whereby no drop occurs in the AV data.

The invention provides a hard disk apparatus, a medium, and an information set in which a transfer rate above a certain level is ensured in recording and reproducing even after alternation processes are carried out in the management of defective regions.

The invention provides a hard disk apparatus, a medium, and an information set in which in the management of defective regions, LBA reassignment is unnecessary.

The invention claimed is:

1. A hard disk apparatus comprising:

recording means of recording AV data onto a hard disk; and stream controlling means, coupled to the recording means, of processing the signal of AV data transmitted from an interface or the signal of AV data transmitted to the interface; wherein, the hard disk apparatus records and/or reproduces the AV data, and wherein, a size of a disk access unit serving as a minimum continuous unit in the access to the hard disk is set to be equal to or greater than a size obtained by the following Formula (1):

$$Rch = \frac{D}{T}, \text{where} \qquad \text{(Formula 1)}$$

Rch indicates a transfer rate per channel, D indicates the size of the disk access unit to be determined, T indicates a process time necessary for recording or reproducing the data of size D, and T is set to be a value equal to the greater value of T1 obtained from the following Formula (2) and T2 obtained from the following Formula (3):

$$T1 = \frac{D}{Ri} \times C + W \times C + S_{st} \times C, \text{where} \qquad \text{(Formula 2)}$$

T1 indicates a process time necessary for recording or reproducing the data of transfer size D to or from the inner circumference of the magnetic disk, Ri indicates a rate of recording to or reproducing from the inner circumference of the magnetic disk, C indicates a number of channels in multi-channel processing, Sst indicates a time necessary for a settling action, and W indicates a time of rotation waiting, $$T2 = (C \div 2)\left(\frac{D}{Ri} + \frac{D}{Ro}\right) + (C\%2)\frac{D}{Ri} + W \times C + (S_{fsk} + S_{st}) \times C, \qquad \text{(Formula 3)}$$

where

T2 indicates a process time necessary for recording or reproducing the data of transfer size D to or from both the inner circumference and the outer circumference of the magnetic disks, Ro indicates a rate of recording to or reproducing from the outer circumference of the magnetic disk, and Sfsk indicates a time necessary for a full stroke.

2. A hard disk apparatus comprising:

recording means of recording AV data onto a hard disk; and stream controlling means coupled to the recording means of processing the signal of the AV data transmitted from an interface; wherein the hard disk apparatus is adapted to record and/or reproduce the AV data in multi-channel processing, and wherein:

the AV data transmitted from the interface and special reproduction information used for special reproduction of the AV data are accumulated in the same buffer in the stream controlling means;

when the sum of the size of the special reproduction information and the size of the AV data accumulated in the buffer equals to a size of a disk access unit serving as a minimum continuous unit in the access to the hard disk, the stream controlling means generates a write request for causing the disk access unit accumulated in the buffer to be transferred to the recording means, and then the recording means records the disk access unit; and when the disk access unit is read out from the buffer in the stream controlling means into the interface, the stream controlling means generates a read request for causing the data to be transferred from the recording means, and then the recording means reads out the disk access unit and thereby stores the data into the buffer.

* * * * *

UNITED STATES PATENT AND TRADEMARK OFFICE
CERTIFICATE OF CORRECTION

| | |
|---|---|
| PATENT NO. | : 7,321,721 B2 |
| APPLICATION NO. | : 10/240181 |
| DATED | : January 22, 2008 |
| INVENTOR(S) | : Yoshiki Kuno et al. |

Page 1 of 1

It is certified that error appears in the above-identified patent and that said Letters Patent is hereby corrected as shown below:

On the Cover Page, FIELD [54] Title "HARD DISK APPARATUS, MEDIUM, AND COLLECTION OF INFORMATION" should read -- HARD DISK APPARATUS, ACCESS METHOD, RECORDING/REPRODUCING METHOD, MEDIUM AND PROGRAM --

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,321,721 B2 | Page 1 of 1 |
| APPLICATION NO. | : 10/240181 | |
| DATED | : January 22, 2008 | |
| INVENTOR(S) | : Yoshiki Kuno et al. | |

It is certified that error appears in the above-identified patent and that said Letters Patent is hereby corrected as shown below:

On the Cover Page, FIELD [54] and Column 1, lines 1 and 2, Title "HARD DISK APPARATUS, MEDIUM, AND COLLECTION OF INFORMATION" should read -- HARD DISK APPARATUS, ACCESS METHOD, RECORDING/REPRODUCING METHOD, MEDIUM AND PROGRAM --

This certificate supersedes the Certificate of Correction issued August 12, 2008.

Signed and Sealed this

Sixteenth Day of September, 2008

JON W. DUDAS
*Director of the United States Patent and Trademark Office*